(12) United States Patent
Tokozakura et al.

(10) Patent No.: US 10,107,382 B2
(45) Date of Patent: Oct. 23, 2018

(54) VEHICULAR DRIVE SYSTEM

(71) Applicant: TOYOTA JIDOSHA KABUSHIKI KAISHA, Tokoyta-shi (JP)

(72) Inventors: Daisuke Tokozakura, Susono (JP); Kazuya Arakawa, Fujinomiya (JP); Takahiro Shiina, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 136 days.

(21) Appl. No.: 15/320,586

(22) PCT Filed: Jun. 23, 2015

(86) PCT No.: PCT/IB2015/001018
§ 371 (c)(1),
(2) Date: Dec. 20, 2016

(87) PCT Pub. No.: WO2015/198122
PCT Pub. Date: Dec. 30, 2015

(65) Prior Publication Data
US 2017/0198803 A1    Jul. 13, 2017

(30) Foreign Application Priority Data

Jun. 25, 2014 (JP) .................................. 2014-130776

(51) Int. Cl.
*F16H 57/04* (2010.01)
*F01M 5/00* (2006.01)
(Continued)

(52) U.S. Cl.
CPC ......... *F16H 57/0417* (2013.01); *F01M 5/005* (2013.01); *F16H 57/04* (2013.01);
(Continued)

(58) Field of Classification Search
CPC .. F16H 57/04; F16H 57/0417; F16H 57/0475; F16H 57/0476; F16H 57/0413;
(Continued)

(56) References Cited

U.S. PATENT DOCUMENTS

| 2010/0197441 A1* | 8/2010 | Pursifull ............. F16H 57/0413 475/161 |
| 2011/0284309 A1* | 11/2011 | Gooden .................. B60H 1/14 180/339 |
| 2014/0190428 A1* | 7/2014 | Kikuchi .............. F16H 57/0413 123/41.55 |

FOREIGN PATENT DOCUMENTS

| JP | 2007-85457 A | 4/2007 |
| JP | 2009/144529 A | 7/2009 |

OTHER PUBLICATIONS

International Search Report dated Nov. 11, 2015 in PCT/IB2015/001018 filed Jun. 23, 2015.

* cited by examiner

*Primary Examiner* — Keith J Frisby
(74) *Attorney, Agent, or Firm* — Oblon, McClelland, Maier & Neustadt, L.L.P.

(57) ABSTRACT

A vehicular drive system includes an engine having a first oil, a transmission having a second oil, and a heat exchanger 4 that exchanges heat between the first oil and the second oil. The magnitude of the amount of reduction of loss torque in the transmission per unit amount of reduction of the kinetic viscosity of the second oil is larger than the magnitude of the amount of increase of loss torque in the engine per unit amount increase of the kinetic viscosity of the first oil.

11 Claims, 28 Drawing Sheets

(51) Int. Cl.
*F28D 21/00* (2006.01)
*B60K 6/44* (2007.10)
*F16H 45/02* (2006.01)

(52) U.S. Cl.
CPC ..... *F16H 57/0413* (2013.01); *F16H 57/0435* (2013.01); *F16H 57/0436* (2013.01); *F16H 57/0475* (2013.01); *F16H 57/0476* (2013.01); *B60K 6/44* (2013.01); *B60Y 2200/92* (2013.01); *B60Y 2306/05* (2013.01); *F16H 45/02* (2013.01); *F16H 2045/0215* (2013.01); *F28D 2021/0089* (2013.01); *Y10S 903/903* (2013.01)

(58) Field of Classification Search
CPC ......... F16H 2045/0215; B60Y 2306/05; F01P 11/08; F01P 2060/045; F01P 2060/04; F01P 2025/40; F28D 2021/0089; F01M 5/005; F01M 5/00
USPC ........................ 180/339; 123/41.55; 475/161
See application file for complete search history.

VEHICULAR DRIVE SYSTEM

BACKGROUND OF THE INVENTION

1. Field of the Invention

The invention relates to a vehicular drive system.

2. Description of Related Art

A temperature regulation system adapted to raise the oil temperature of a transmission is known. For example, a temperature regulation system for regulating the temperature of transmission oil is disclosed in Japanese Patent Application Publication No. 2007-85457 (JP 2007-85457 A). In this system, a heat-exchange pipe is installed in an oil pan of a transmission of an automobile, and engine oil that is led from a circulation system of engine oil is caused to flow through the heat-exchange pipe, so that the transmission oil is warmed by heat of the engine oil.

When heat is transferred from the engine oil to the oil of the transmission, loss of the transmission is reduced due to increase of the temperature of the transmission oil, whereas loss of the engine is increased due to reduction of the temperature of the engine oil. Thus, through the heat exchange, the overall loss as the sum of the loss of the engine and the loss of the transmission may be increased.

SUMMARY OF THE INVENTION

In view of the above problem, the invention provides a vehicular drive system that can reduce a total loss as the sum of a loss of an engine and a loss of a transmission.

According to one aspect of the invention, a vehicular drive system including an engine, a transmission, and a heat exchanger is provided. The engine has first oil. The transmission has second oil. The heat exchanger is configured to exchange heat between the first oil and the second oil. In the drive system, a magnitude of an amount of reduction of loss torque in the transmission per unit amount of reduction of kinetic viscosity of the second oil is larger than a magnitude of an amount of increase of loss torque in the engine per unit amount of increase of the kinetic viscosity of the first oil.

In the vehicular drive system as described above, when compared in the same period during heat exchange, the magnitude of the amount of reduction of the loss torque in the transmission according to reduction of the kinetic viscosity due to a temperature rise of the second oil may exceed the magnitude of the amount of increase of the loss torque in the engine according to increase of the kinetic viscosity due to a temperature reduction of the first oil.

In the vehicular drive system as described above, the transmission may include a transmission oil passage and a second oil pump. The second oil pump may be configured to feed the second oil under pressure via the transmission oil passage. The heat exchanger may be connected to the transmission oil passage. The heat exchanger may be configured to exchange heat between the first oil and the second oil, the second oil flowing through the transmission oil passage.

In the vehicular drive system as described above, the engine may include an engine oil passage, a first oil pump, and an oil filter. The first oil pump may be configured to feed the first oil under pressure via the engine oil passage. The oil filter may be disposed in the engine oil passage. The heat exchanger may be connected to a downstream side of the oil filter in the engine oil passage, as viewed in a direction of flow of the first oil.

The vehicular drive system may further include an electronic control unit. The electronic control unit may be configured to supply the second oil to at least one of an intake side of a second oil pump or a supply oil passage of a torque converter. Here, the second oil is an oil that has been subjected to heat exchange by the heat exchanger. The torque converter may have a lock-up clutch.

In the vehicular drive system as described above, the transmission may include a return oil passage through which the second oil is supplied to an intake oil passage of the second oil pump. Here, the second oil is redundant oil as a part of the second oil delivered from the second oil pump under pressure. The heat exchanger may be configured to exchange heat between the first oil and the second oil flowing through the return oil passage.

In the vehicular drive system as described above, the transmission may include a switching valve. The switching valve may be configured to switch between a condition where the second oil that has been subjected to heat exchange is supplied to an intake side of the second oil pump, and a condition where the second oil that has been subjected to heat exchange is supplied to a supply oil passage of the torque converter.

The vehicular drive system as described above may further include an electronic control unit. The electronic control unit may be configured to reduce a flow rate of the second oil after completion of warm-up of the transmission, such that the flow rate becomes smaller than that before completion of warm-up of the transmission. Here, the second oil may be an oil passing through the heat exchanger.

The vehicular drive system may further include an oil cooler, and a rotating electric machine. The oil cooler may be configured to cool the second oil. The rotating electric machine may be located on a downstream side of the oil cooler in a flow passage of the second oil. The heat exchanger may be connected to an upstream side of the oil cooler in the flow passage of the second oil.

The vehicular drive system as described above may further include an electric oil pump and an electronic control unit. The electric oil pump may be configured to cause the second oil to flow through the oil cooler. The electronic control unit may be configured to, when the temperature of the second oil is equal to or higher than a specified temperature, (i) operate the electric oil pump, and (ii) supply the second oil cooled by the oil cooler to the rotating electric machine.

The vehicular drive system as described above may further include an oil cooler, a rotating electric machine, a flow control valve, and an electronic control unit. The oil cooler may be configured to cool the second oil. The rotating electric machine may be located on a downstream side of the oil cooler and the heat exchanger in a flow passage of the second oil. The flow control valve may be configured to control a flow rate of the second oil supplied to the heat exchanger and the flow rate of the second oil supplied to the oil cooler. The electronic control unit may be configured to make the flow rate of the second oil supplied to the heat exchanger smaller than the flow rate of the second oil supplied to the oil cooler when a temperature of the second oil is equal to or higher than a specified temperature.

The vehicular drive system as described above includes the engine having the first oil, transmission having the second oil, and the heat exchanger that exchanges heat between the first oil and the second oil. The magnitude of the amount of reduction of loss torque in the transmission per unit amount of reduction of the kinetic viscosity of the second oil is larger than the magnitude of the amount of increase of loss torque in the engine per unit amount of increase of the kinetic viscosity of the first oil. Accordingly, the total loss as the sum of the loss of the engine and the loss of the transmission can be advantageously reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

In the following, vehicular drive systems according to some embodiments of the invention will be described in detail with reference to the drawings. It is to be understood that this invention is not limited by these embodiments. Also, constituent elements of each of the following embodiments include those that can be easily conceived by those skilled in the art, and substantially the same elements.

Figure 1:
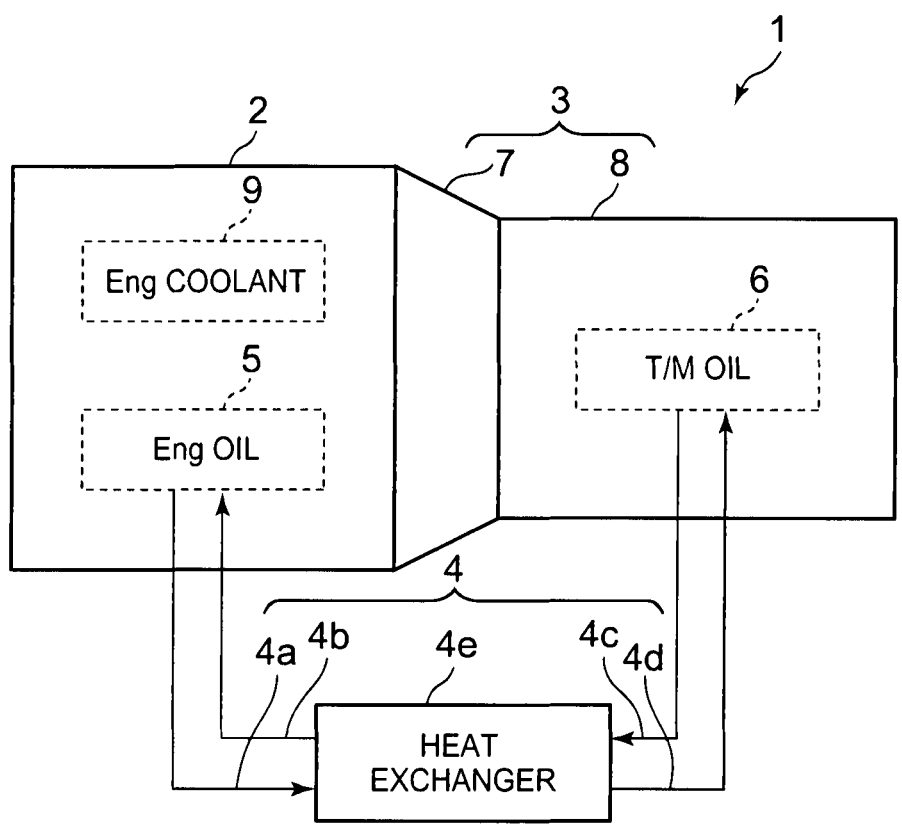
FIG. 1 is a schematic view showing the configuration of a vehicular drive system according to a first embodiment of the invention.
Figure 2:
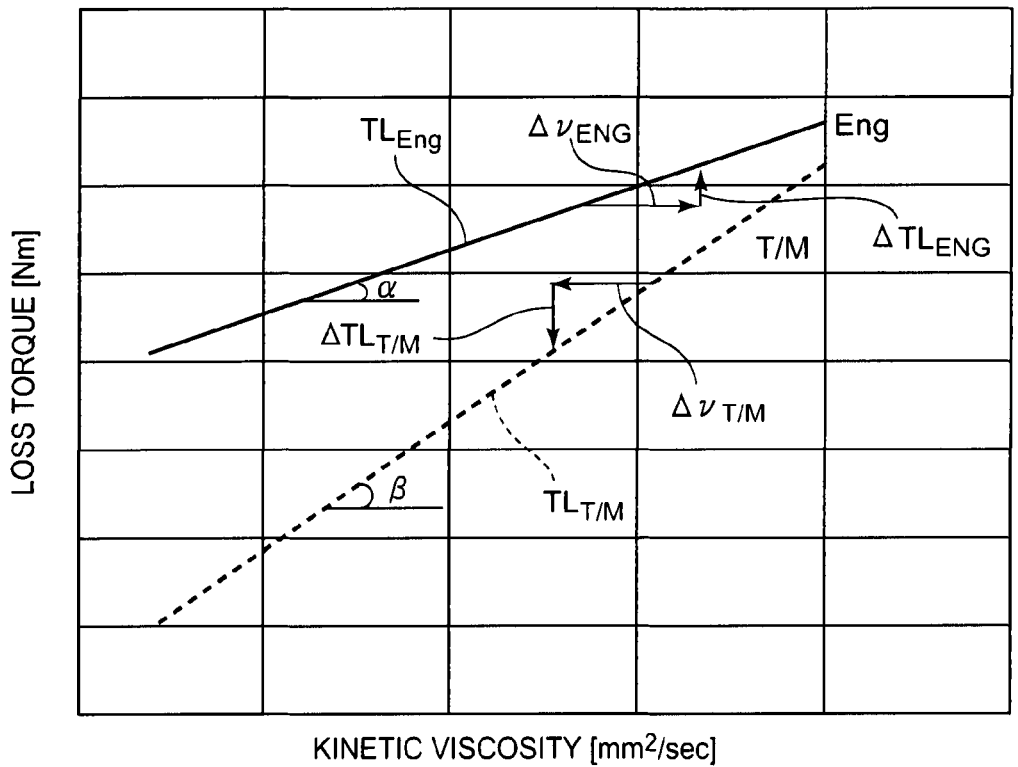
FIG. 2 is a view showing the relationship between the kinetic viscosity of oil and loss torque in the vehicular drive system according to the first embodiment.
Figure 3:
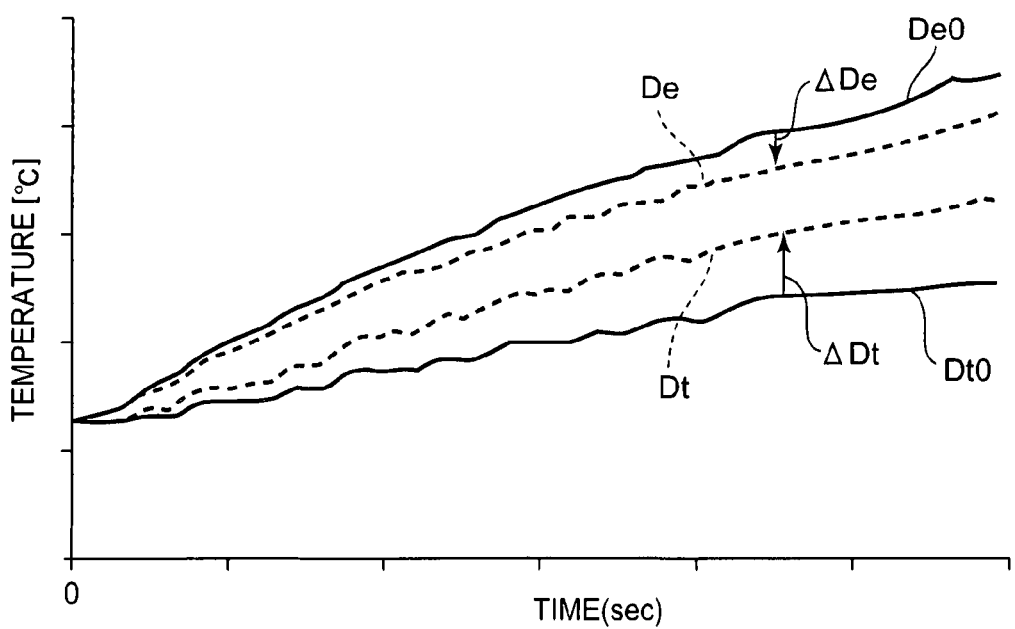
FIG. 3 is a view showing changes in the oil temperature with time in the vehicular drive system according to the first embodiment.
Figure 4:
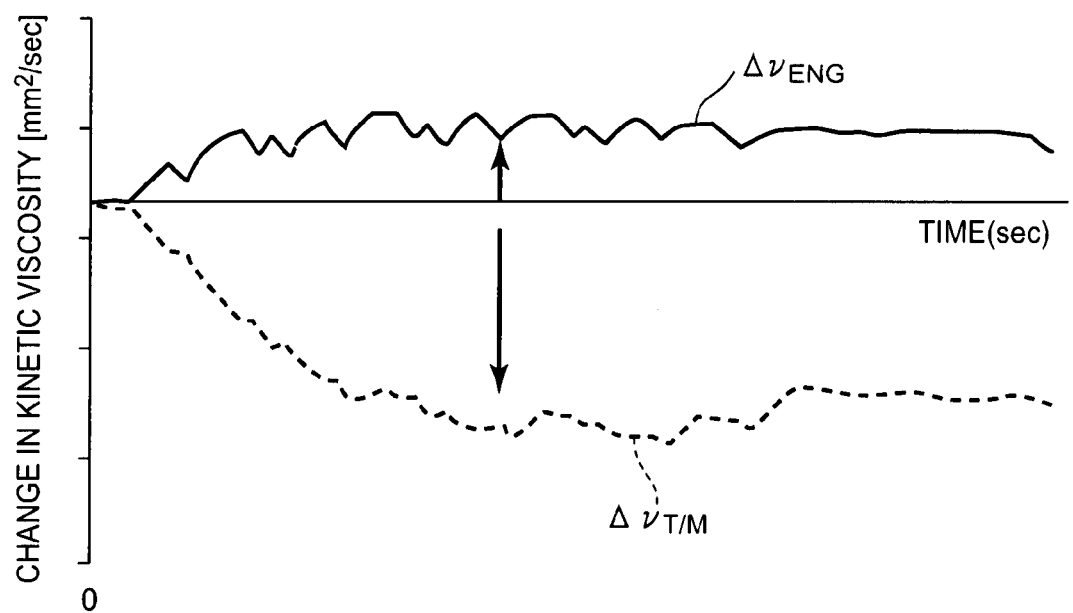
FIG. 4 is a view showing changes in the kinetic viscosity of oil in the vehicular drive system according to the first embodiment.
Figure 5:
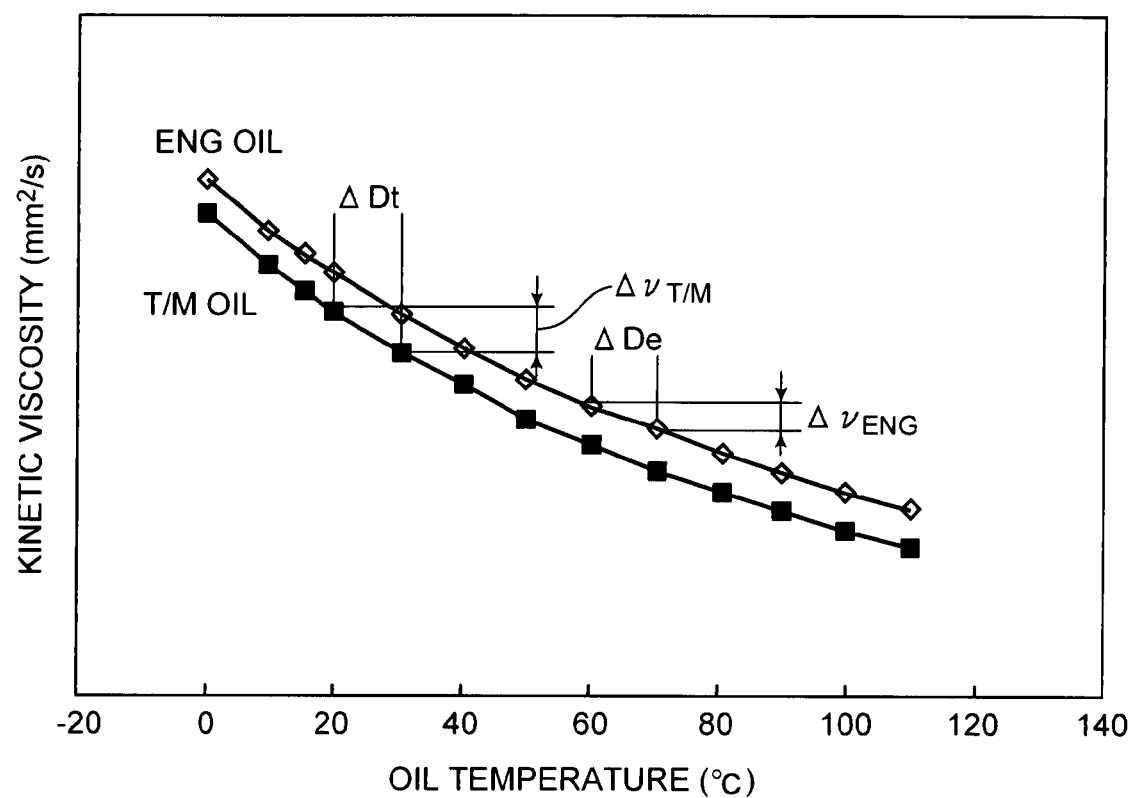
FIG. 5 is a view showing one example of relationship between the oil temperature and the kinetic viscosity.
Figure 6:
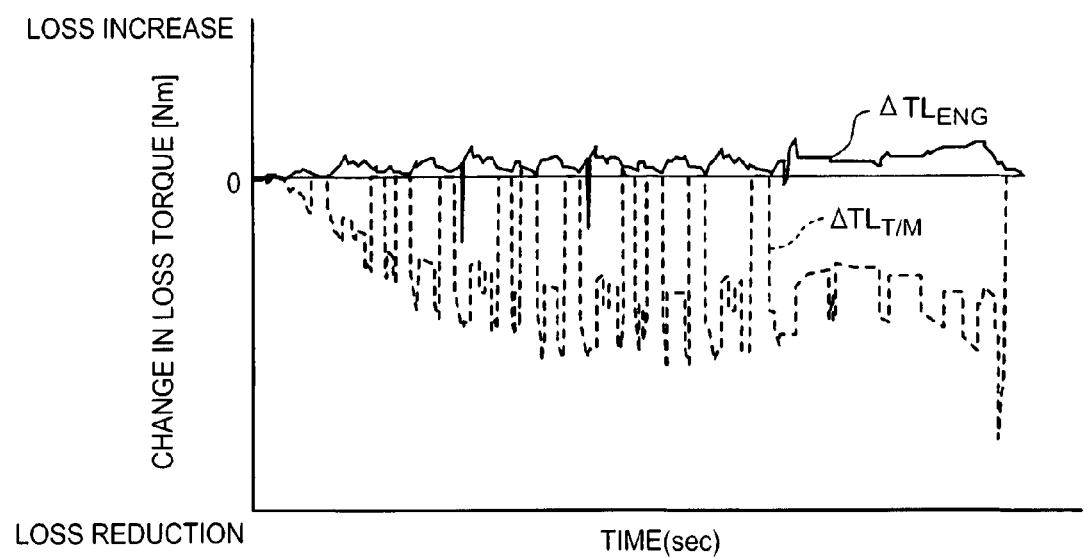
FIG. 6 is a view showing changes in loss torque of an engine and a transmission of the vehicular drive system according to the first embodiment.
Figure 7:
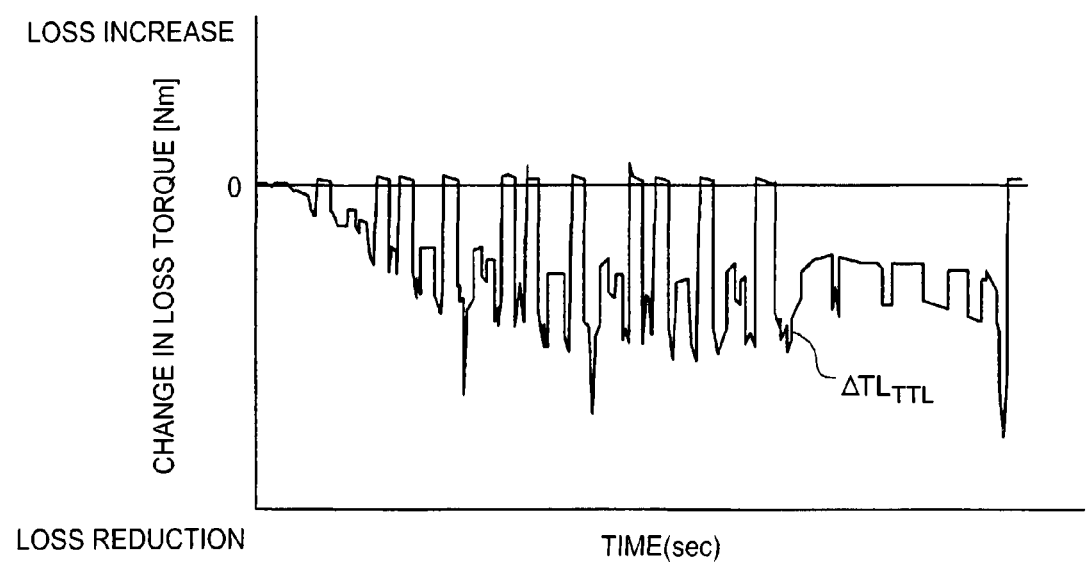
FIG. 7 is a view showing changes in total loss torque with time in the vehicular drive system according to the first embodiment.
Figure 8:
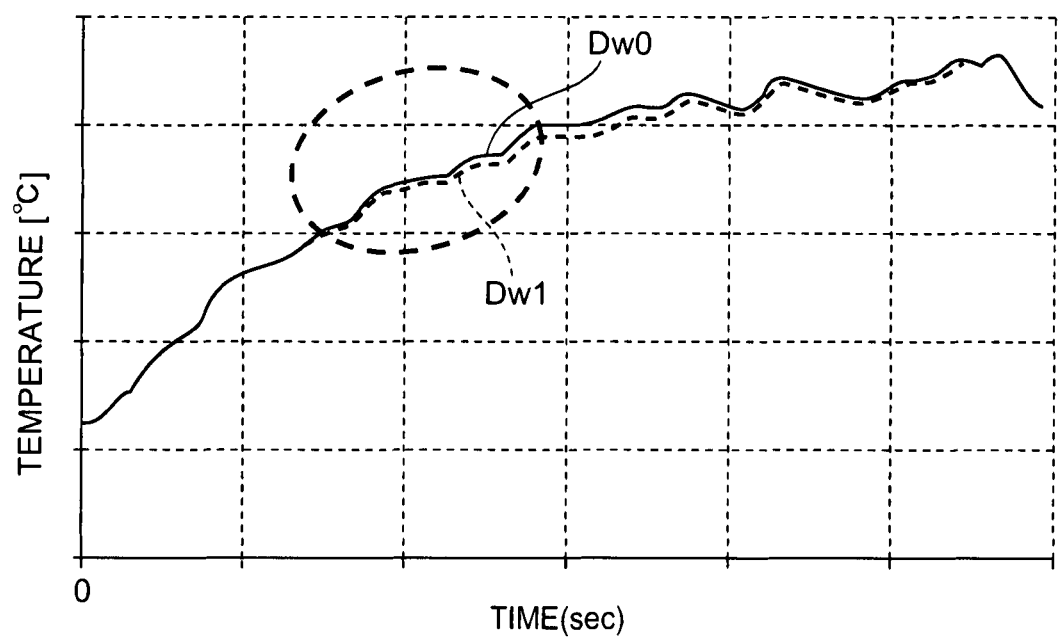
FIG. 8 is a view showing changes in engine coolant temperature with time in the vehicular drive system according to the first embodiment.

Referring to FIG. 1 through FIG. 15, a first embodiment of the invention will be described. This embodiment is concerned with a vehicular drive system. FIG. 1 is a schematic view showing the configuration of the vehicular drive system according to the first embodiment of the invention. FIG. 2 is a view showing the relationship between the kinetic viscosity of oil and loss torque in the vehicular drive system according to the first embodiment. FIG. 3 is a view showing changes in the oil temperature with time in the vehicular drive system according to the first embodiment. FIG. 4 is a view showing changes in the kinetic viscosity of oil in the vehicular drive system according to the first embodiment. FIG. 5 is a view showing one example of relationship between the oil temperature and the kinetic viscosity. FIG. 6 is a view showing changes in loss torque of an engine and a transmission of the vehicular drive system according to the first embodiment. FIG. 7 is a view showing changes in total loss torque with time in the vehicular drive system according to the first embodiment. FIG. 8 is a view showing changes in engine coolant temperature with time in the vehicular drive system according to the first embodiment.

Figure 9:
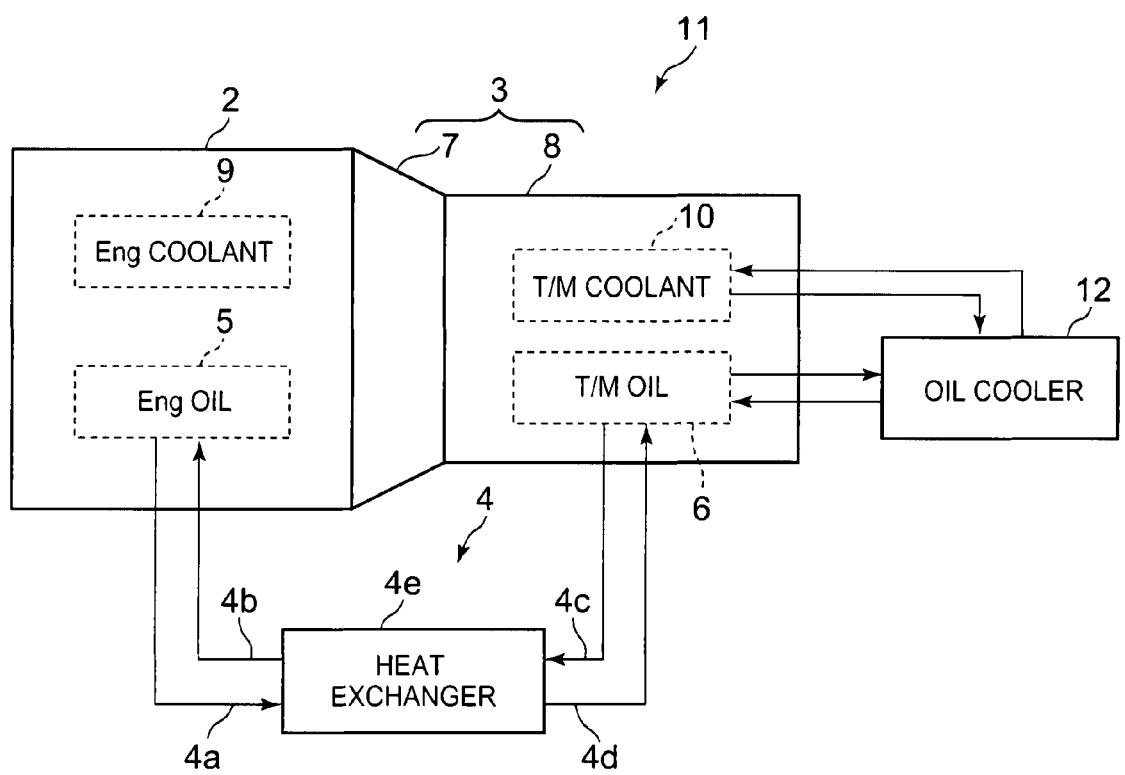
FIG. 9 is a schematic view showing the configuration of a vehicular drive system for a hybrid vehicle according to the first embodiment.
Figure 10:
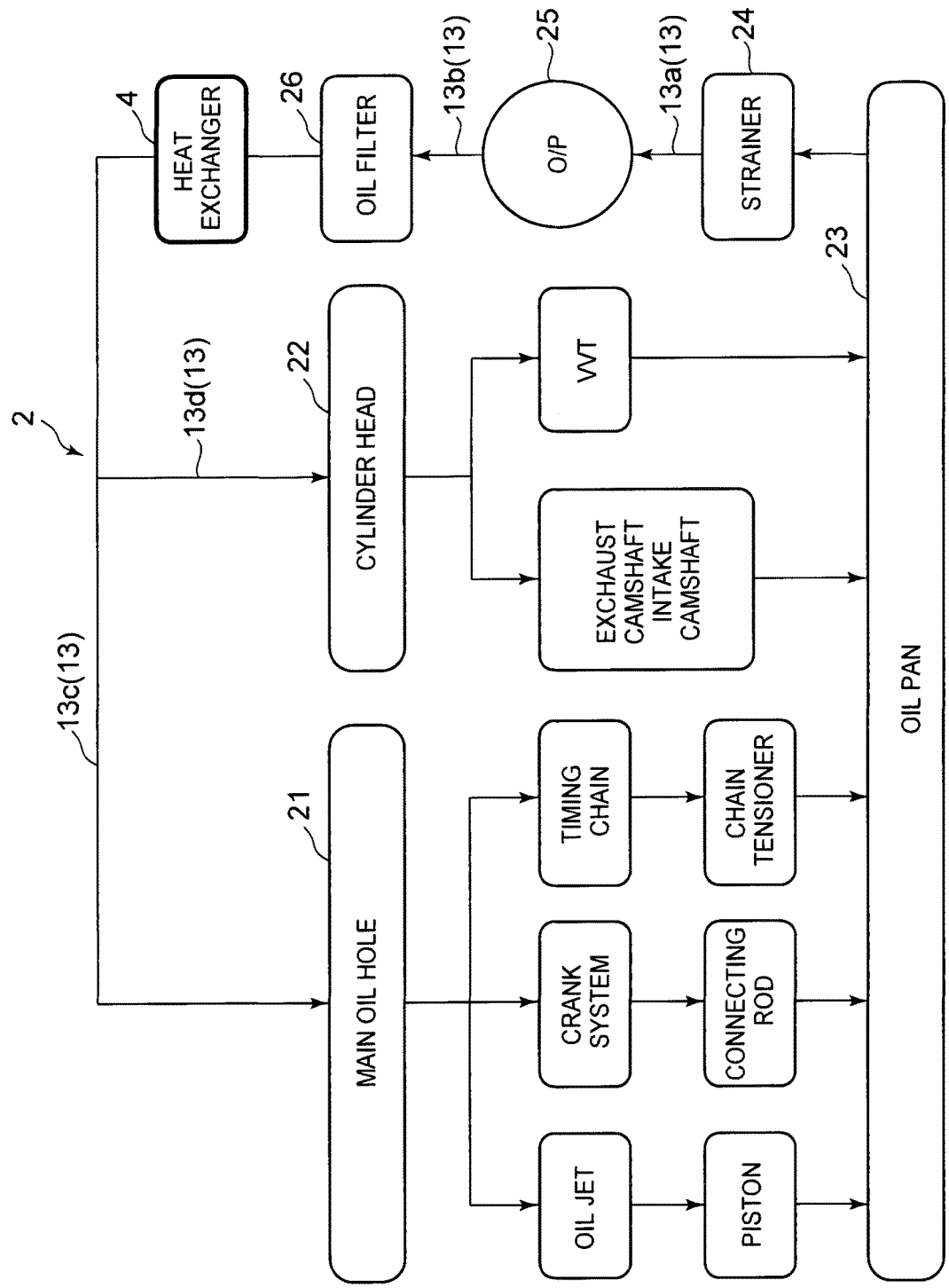
FIG. 10 is an explanatory diagram of an engine oil passage through which oil flows in the engine.
Figure 11:
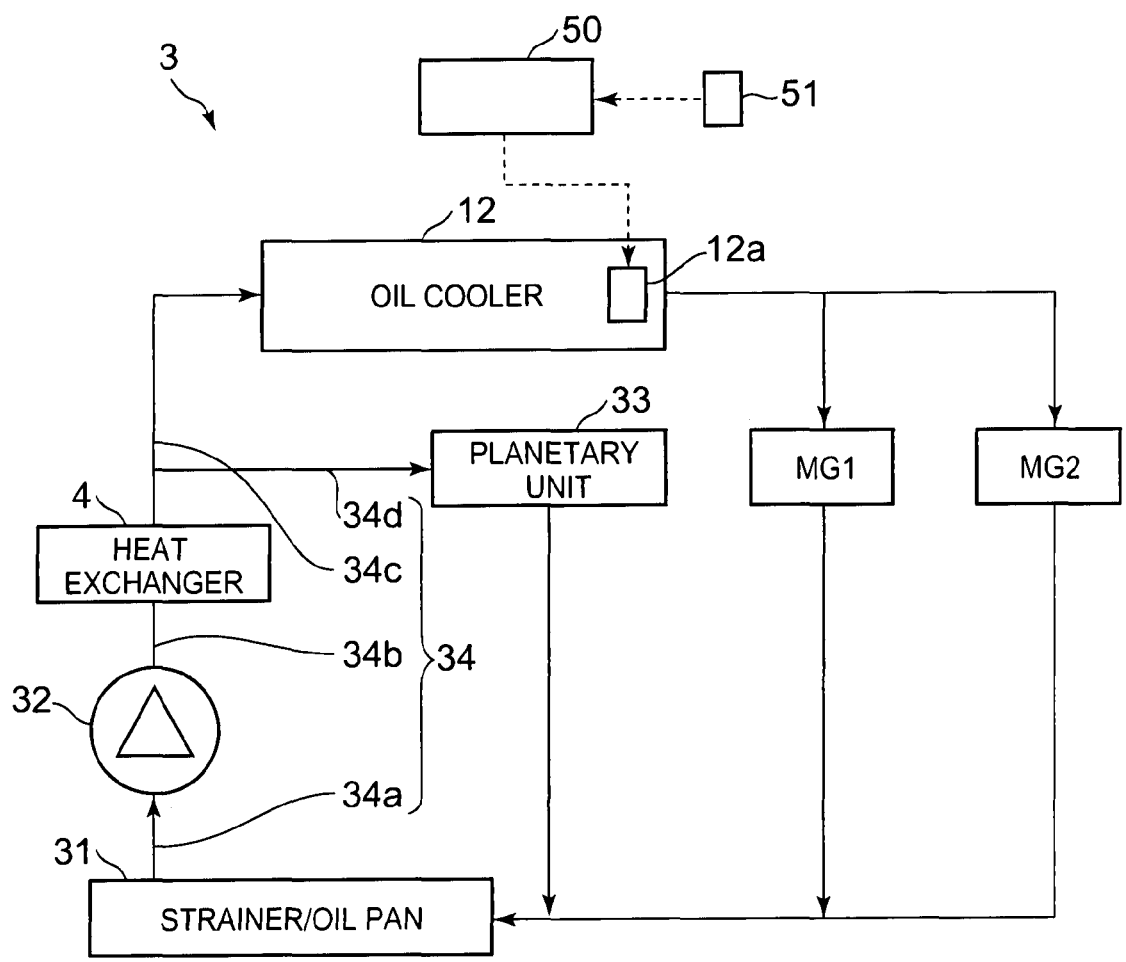
FIG. 11 is an explanatory diagram of a transmission oil passage through which oil flows in the transmission.
Figure 12:
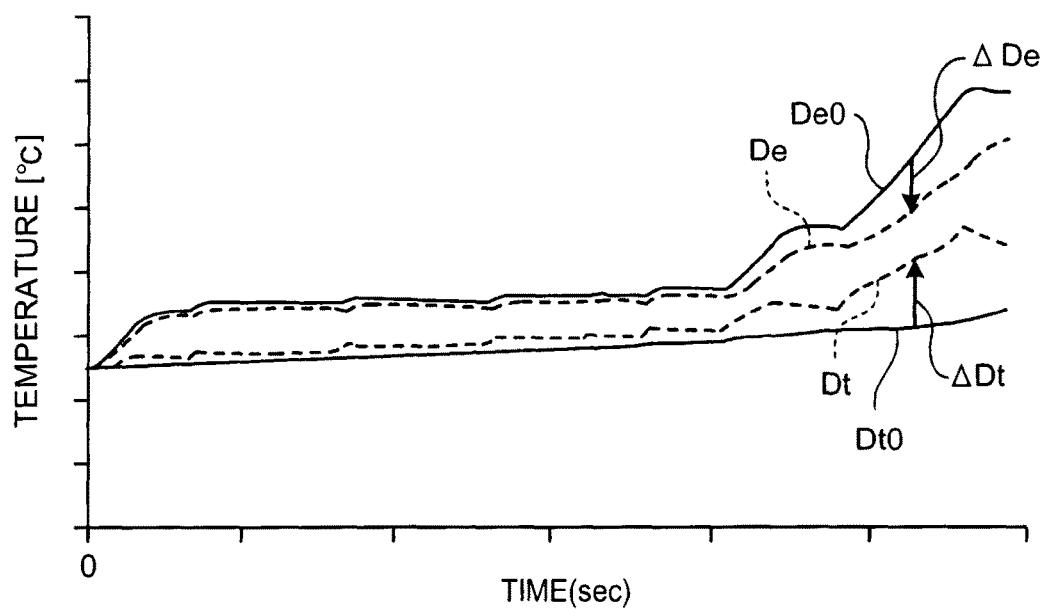
FIG. 12 is a view showing changes in the oil temperature with time in the vehicular drive system for the hybrid vehicle, in the first embodiment.
Figure 13:
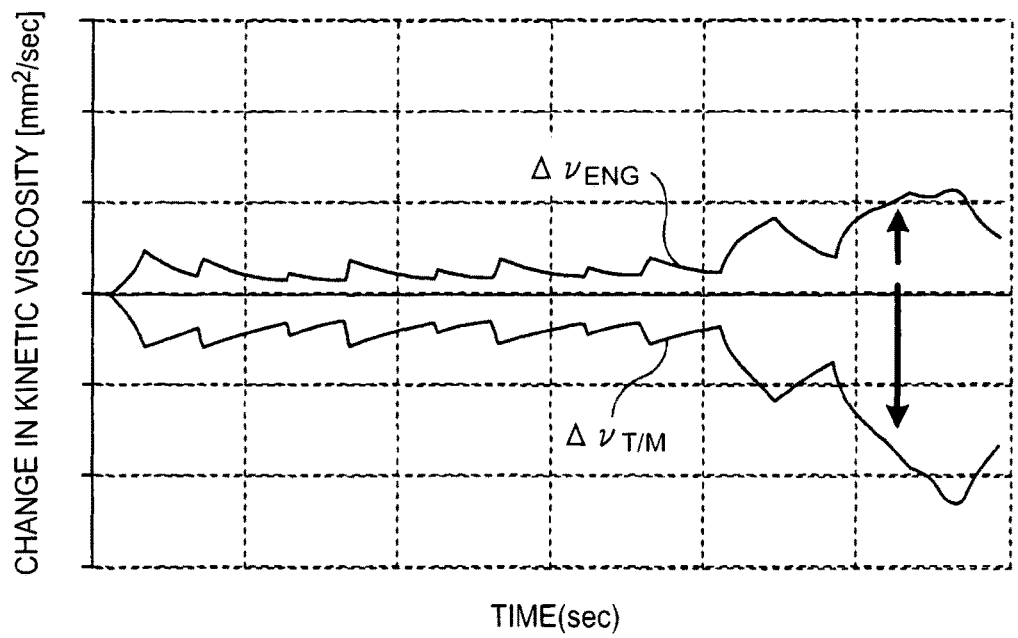
FIG. 13 is a view showing changes in the kinetic viscosity of oil in the vehicular drive system for the hybrid vehicle.
Figure 14:
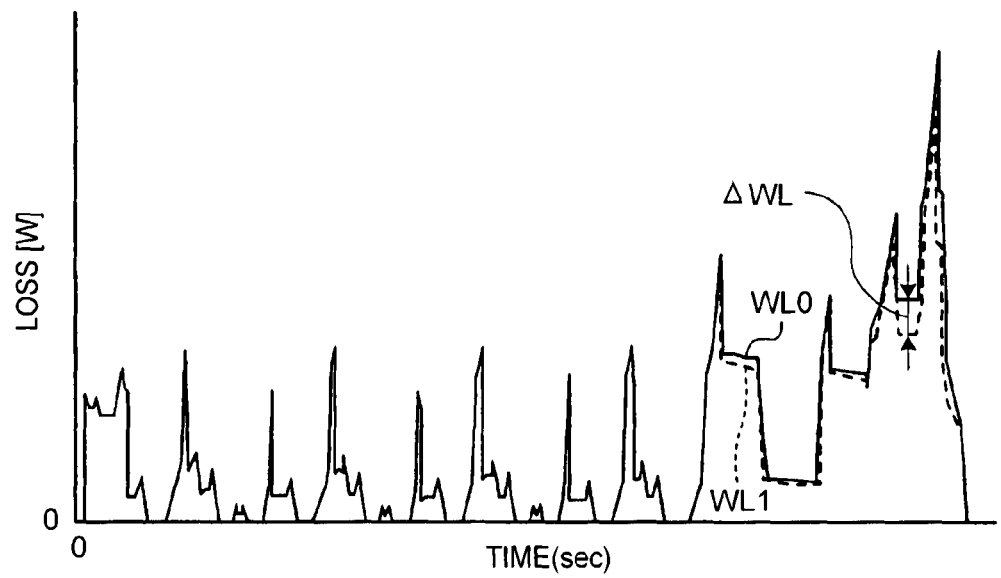
FIG. 14 is a view showing changes in total loss torque with time in the vehicular drive system for the hybrid vehicle.
Figure 15:
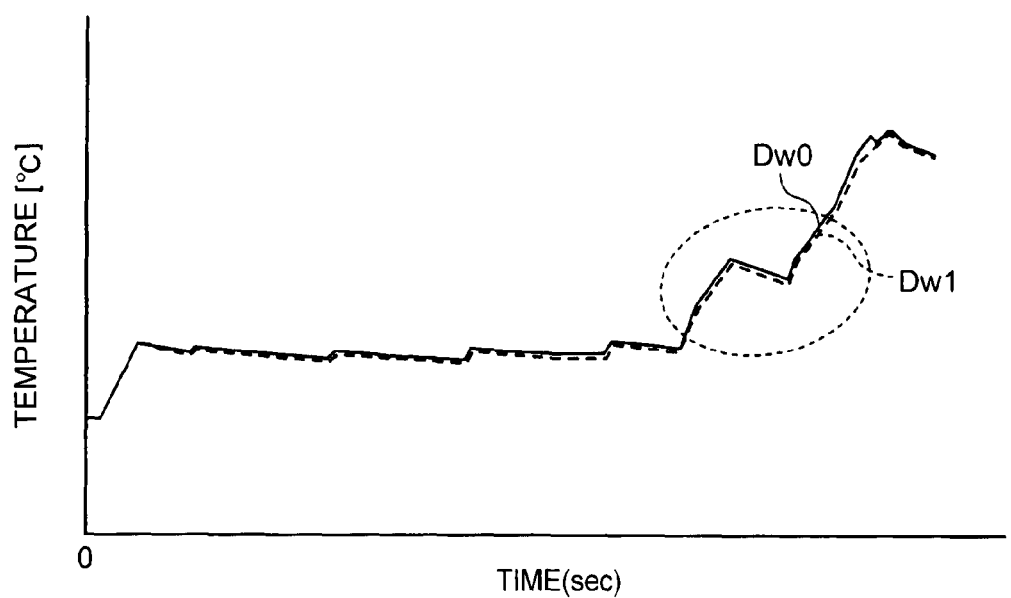
FIG. 15 is a view showing changes in engine coolant temperature with time in the vehicular drive system for the hybrid vehicle.

FIG. 9 is a schematic view showing the configuration of a vehicular drive system for a hybrid vehicle according to the first embodiment. FIG. 10 is an explanatory diagram of an engine oil passage. FIG. 11 is an explanatory diagram of a transmission oil passage. FIG. 12 is a view showing changes in the oil temperature with time in the vehicular drive system for the hybrid vehicle. FIG. 13 is a view showing changes in the kinetic viscosity of oil in the vehicular drive system for the hybrid vehicle. FIG. 14 is a view showing changes in total loss torque with time in the vehicular drive system for the hybrid vehicle. FIG. 15 is a view showing changes in engine coolant temperature with time in the vehicular drive system for the hybrid vehicle.

As shown in FIG. 1, the vehicular drive system 1 according to the first embodiment includes an engine 2 having a first oil 5, a transmission 3 having a second oil 6, and a heat exchanger 4 that exchanges heat between the first oil 5 and the second oil 6. The first oil 5 is, for example, so-called engine oil. The second oil 6 is, for example, so-called transmission oil. In the vehicular drive system 1 of this embodiment, the magnitude $|\Delta TL_{T/M}/\Delta v_{T/M}|$ (=Tan $\beta$) of the amount of reduction of loss torque in the transmission 3 per unit amount of reduction of the kinetic viscosity v of the second oil 6 is larger than the magnitude $|\Delta TL_{ENG}/\Delta v_{ENG}|$ (=Tan $\alpha$) of the amount of increase of loss torque in the engine 2 per unit amount of increase of the kinetic viscosity v of the first oil 5, as will be explained with reference to FIG. 2. The kinetic viscosity v [mm$^2$/sec] is defined by the following equation (1). In this equation, $\delta$ is viscosity [Pa·sec], and $\rho$ is density [kg/m$^3$].

$$v=\delta/\rho \quad (1)$$

In FIG. 2, the horizontal axis indicates the kinetic viscosity v [mm$^2$/sec], and the vertical axis indicates the loss torque [Nm]. The loss torque $TL_{ENG}$ of the engine 2 indicates the correspondence relationship between the value of the kinetic viscosity v of the first oil 5, and the magnitude of the loss torque of the engine 2. The line indicating the loss torque $TL_{ENG}$ of the engine 2 of this embodiment is, for example, a straight line obtained by linearly approximating values of loss torque calculated from actual measurement values of engine torque (straight-line approximation). The loss torque $TL_{ENG}$ of the engine 2 is, for example, a torque difference between theoretical output torque of the engine 2 and actual output torque of the engine 2. The theoretical output torque of the engine 2 is output torque of the engine 2 in the case where the kinetic viscosity of the first oil 5 is equal to 0, in other words, output torque of the engine 2 in the case where there is no drag loss, or the like, due to the viscous property of the first oil 5.

The line of the loss torque TL is preferably obtained by approximating actual measurement values (or calculation values by simulation) within a given temperature range. The given temperature range is, for example, a range of assumed ambient temperatures, a temperature range of a normal-use region, or a temperature range set in mode running for calculation of the fuel consumption. The lower limit of the given temperature range is, for example, 25° C. or 0° C. The upper limit of the given temperature range is, for example, a steady-state temperature or a temperature of a threshold value indicative of warm-up completion, and may be set to 80° C. as one example. The upper limit of the given temperature range may also be set to a service temperature limit of the oil 5, 6, for example, 120° C.

If the temperature of the first oil 5 is reduced, due to heat exchange in the heat exchanger 4, the kinetic viscosity $v_{ENG}$ of the first oil 5 increases. The amount $\Delta TL_{ENG}$ of increase of the loss torque of the engine 2 is determined according to the amount $\Delta v_{ENG}$ of increase of the kinetic viscosity caused by the temperature reduction. The magnitude $|\Delta TL_{ENG}/\Delta v_{ENG}|$ of the amount of increase of the loss torque in the engine 2 per unit amount of increase of the kinetic viscosity of the first oil 5 can be obtained as Tan $\alpha$, from the slope $\alpha$ of the loss torque $TL_{ENG}$. In the following description, the degree of change of the loss torque in the engine 2 relative to change of the kinetic viscosity of the first oil 5 will also be called "loss torque sensitivity Tan $\alpha$ of the engine 2".

The loss torque $TL_{T/M}$ of the transmission 3 indicates the correspondence relationship between the value of the kinetic viscosity $v_{T/M}$ of the second oil 6, and the magnitude of output torque of the transmission 3. The loss torque $TL_{T/M}$ of the transmission 3 is, for example, a torque difference between input torque and output torque of the transmission 3. The line indicating the loss torque $TL_{T/M}$ of the transmission 3 is, for example, a straight line obtained by linearly approximating values of loss torque calculated from actual measurement values of the input torque and output torque of the transmission 3 (straight-line approximation).

If the temperature of the second oil 6 rises due to heat exchange in the heat exchanger 4, the kinetic viscosity $v_{T/M}$ of the second oil 6 is reduced. The amount $\Delta TL_{T/M}$ of reduction of the loss torque of the transmission 3 is determined according to the amount $\Delta v_{T/M}$ of reduction of the kinetic viscosity caused by the temperature rise. The magnitude $|\Delta TL_{T/M}/\Delta v_{T/M}|$ of the amount of reduction of the loss torque in the transmission 3 per unit amount of reduction of the kinetic viscosity of the second oil 6 can be obtained as Tan $\beta$, from the slope $\beta$ of the loss torque $TL_{T/M}$. In the following description, the degree of change of the loss torque in the transmission 3 relative to change of the kinetic viscosity of the second oil 6 will also be called "loss torque sensitivity Tan $\beta$ of the transmission 3".

In this specification, the temperature De of the first oil 5 as engine oil will also be called "engine oil temperature De". Also, the temperature Dt of the second oil 6 as transmission oil will also be called "transmission oil temperature Dt". When the engine 2 operates during cold start, for example, the engine oil temperature De generally rises more rapidly than the transmission oil temperature Dt. In other words, the engine oil temperature De becomes higher than the transmission oil temperature Dt. Accordingly, during warm-up operation, heat is transferred from the first oil 5 to the second oil 6 in the heat exchanger 4. With the heat thus exchanged, the engine oil temperature De decreases, and the loss torque of the engine 2 increases. On the other hand, the transmission oil temperature Dt increases, and the loss torque of the transmission 3 decreases.

In the vehicular drive system 1 of this embodiment, as shown in FIG. 2, the loss torque sensitivity Tan $\beta$ of the transmission 3 is larger than the loss torque sensitivity Tan $\alpha$ of the engine 2. Accordingly, the magnitude of the amount $\Delta TL_{T/M}$ of reduction of the loss torque of the transmission 3 according to reduction of the kinetic viscosity $v_{T/M}$ caused by increase of the transmission oil temperature Dt due to heat exchange in the heat exchanger 4 is larger than the magnitude of the amount $\Delta TL_{ENG}$ of increase of the loss torque of the engine 2 according to increase of the kinetic viscosity $v_{ENG}$ caused by reduction of the engine oil temperature De due to heat exchange. Consequently, the magnitude of total loss torque $TL_{TTL}$ that is the sum of the loss torque $TL_{ENG}$ of the engine 2 and the loss torque $TL_{T/M}$ of the transmission 3 can be reduced, and the loss torque of the vehicular drive system 1 can be reduced.

Referring back to FIG. 1, the transmission 3 includes a torque converter 7 and a transmission main body 8. The engine 2 converts combustion energy of fuel into rotary motion, and delivers it to the torque converter 7. The torque converter 7 includes a fluid transmitting part, and a lock-up clutch. The torque converter 7 transmits torque received from the engine 2, to the transmission main body 8.

The engine 2 includes an engine coolant 9 and the first oil 5. The engine coolant 9 cools each part of the engine 2. The first oil 5 lubricates and cools each part of the engine 2. Also, the hydraulic pressure of the first oil 5 is used for driving a variable valve train, and so forth.

The transmission 3 includes the second oil 6. The second oil 6 lubricates and cools each part of the torque converter 7 and the transmission main body 8. Also, the hydraulic pressure of the second oil 6 is used for controlling engagement and release of the lock-up clutch of the torque converter 7. The hydraulic pressure of the second oil 6 is also used for controlling the speed ratio of the transmission main body 8. The transmission 3 of this embodiment is, for example, a multi-speed automatic transmission (AT) having two or more gear positions, for example. In the multi-speed automatic transmission, the engaging pressure of each engagement device is adjusted by use of the hydraulic pressure of the second oil 6.

The heat exchanger 4 exchanges heat between the first oil 5 and the second oil 6. The heat exchanger 4 includes a first inflow passage 4a, first outflow passage 4b, second inflow passage 4c, second outflow passage 4d, and a heat exchange part 4e. The first oil 5 in the engine 2 flows into the heat exchange part 4e via the first inflow passage 4a. The first oil 5 is returned from the heat exchange part 4e to the engine 2 via the first outflow passage 4b. The second oil 6 in the transmission 3 flows into the heat exchange part 4e via the second inflow passage 4c. The second oil 6 is returned from the heat exchange part 4e to the transmission 3 via the second outflow passage 4d. In the heat exchange part 4e, heat is exchanged between the first oil 5 and the second oil 6.

Referring to FIG. 3, temperature changes of each oil in the case where the heat exchanger 4 is provided will be described. In FIG. 3, the horizontal axis indicates time [sec], and the vertical axis indicates temperature [° C.]. In FIG. 3, the engine oil temperature De in the vehicular drive system 1 of this embodiment, and the engine oil temperature De0 in a drive system that does not include the heat exchanger 4 of the vehicular drive system 1 are indicated as engine oil temperatures. Also, in FIG. 3, the transmission oil temperature Dt in the vehicular drive system 1 of this embodiment, and the transmission oil temperature Dt0 in the drive system that does not include the heat exchanger 4 of the vehicular drive system are indicated as transmission oil temperatures. FIG. 3 shows temperature changes in the case where the vehicle runs in an EC mode (EC_TYPE_Driving Cycle) as one of modes used for measurement of fuel consumption. In FIGS. 4, 6, 7, and 8, too, results obtained in the same mode are shown.

As is understood from FIG. 3, in the vehicular drive system 1 having the heat exchanger 4, the engine oil temperature De changes with time among relatively low values, whereas the transmission oil temperature Dt changes with time among relatively high values, as compared with the drive system that does not have the heat exchanger 4. In FIG. 4, increase and decrease of the kinetic viscosity according to the oil temperature changes shown in FIG. 3 are indicated. In FIG. 4, the horizontal axis indicates time [sec], and the vertical axis indicates the kinetic viscosity [mm$^2$/sec]. The amount $\Delta v_{ENG}$ of change of the kinetic viscosity of the first oil 5 is a difference between the value of the kinetic viscosity $v_{ENG}$ of the first oil 5 where the heat exchanger 4 is provided, and the value of the kinetic viscosity $v_{ENG}$ of the first oil 5 where the heat exchanger 4 is not provided. The amount $\Delta v_{ENG}$ of change of the kinetic viscosity of the first oil 5 is a difference between the value of the kinetic viscosity $v$ of the first oil 5 at the engine oil temperature De, and the value of the kinetic viscosity $v$ of the first oil 5 at the engine oil temperature De0.

The amount $\Delta v_{ENG}$ of change of the kinetic viscosity of the first oil 5 is expressed by the following equation (2), where $v_{ENG}(De)$ denotes the kinetic viscosity $v$ of the first oil 5 at a certain engine oil temperature De. As shown in FIG. 4, the kinetic viscosity $v$ of the first oil 5 increases due to heat exchange performed by the heat exchanger 4.

$$\Delta v_{ENG} = v_{ENG}(De) - v_{ENG}(De0) \qquad (2)$$

The amount $\Delta v_{T/M}$ of change of the kinetic viscosity of the second oil 6 is a difference between the value of the kinetic viscosity $v_{T/M}$ of the second oil 6 where the heat exchanger 4 is provided, and the value of the kinetic viscosity $v_{T/M}$ of the second oil 6 where the heat exchanger 4 is not provided. The amount $\Delta v_{ENG}$ of change of the kinetic viscosity of the second oil 6 is a difference between the value of the kinetic viscosity $v_{T/M}$ of the second oil 6 at the transmission oil temperature Dt, and the value of the kinetic viscosity $v_{T/M}$ of the second oil 6 at the transmission oil temperature Dt0.

The amount $\Delta v_{T/M}$ of change of the kinetic viscosity of the second oil 6 is expressed by the following equation (3), where $v_{T/M}(Dt)$ denotes the kinetic viscosity $v_{T/M}$ of the second oil 6 at a certain transmission oil temperature Dt. As shown in FIG. 4, the kinetic viscosity $v$ of the second oil 6 decreases due to heat exchange performed by the heat exchanger 4.

$$\Delta v_{T/M} = v_{T/M}(Dt) - v_{T/M}(Dt0) \qquad (3)$$

The amount $\Delta v_{ENG}$, $\Delta v_{T/M}$ of change of the kinetic viscosity is determined according to characteristics of each oil 5, 6. FIG. 5 shows one example of the correspondence relationship between the oil temperature and the kinetic viscosity. In FIG. 5, the horizontal axis indicates the oil temperature [° C.], and the vertical axis indicates the kinetic viscosity [mm$^2$/sec]. As shown in FIG. 5, the kinetic viscosity $v_{ENG}$ of the first oil 5 and the kinetic viscosity $v_{T/M}$ of the second oil 6 are both reduced as the oil temperature increases. Also, both lines indicating the relationships between the oil temperature, and the kinetic viscosity $v_{ENG}$ of the first oil 5 and the kinetic viscosity $v_{T/M}$ of the second oil 6, are slightly curved downward. In other words, the slopes of these lines associated with the kinetic viscosity $v_{ENG}$ of the first oil 5 and the kinetic viscosity $v_{T/M}$ of the second oil 6 in a low oil temperature zone are larger than the slopes of these lines associated with the kinetic viscosity $v_{ENG}$ of the first oil 5 and the kinetic viscosity $v_{T/M}$ of the second oil 6 in a high oil temperature zone Also, the amount $\Delta v_{ENG}$, $\Delta v_{T/M}$ of change of the kinetic viscosity is determined according to the heat capacity of each oil 5, 6. Namely, the temperature of each oil 5, 6 changes according to the heat capacity, depending on the quantity of heat given to the oil by heat exchange, or the quantity of heat removed from the oil by heat exchange. For example, if the quantity Q of heat is removed from the first oil 5 through heat exchange by the heat exchanger 4, the engine oil temperature De is reduced according to the quantity Q of heat and the heat capacity $C_{ENG}$ of the first oil 5. Where the amount of change of the engine oil temperature De is represented by $\Delta$De, the amount $\Delta v_{ENG}$ of change of the kinetic viscosity of the first oil 5 is determined from the amount $\Delta$De of change of the engine oil temperature De, and the characteristics of the first oil 5 shown in FIG. 5. Further, the amount $\Delta TL_{ENG}$ of increase of the loss torque of the engine 2 is determined from the amount $\Delta v_{ENG}$ of change of the kinetic viscosity of the first oil 5 and the loss torque sensitivity Tan α of the engine 2.

On the other hand, if the quantity Q of heat is given to the second oil 6 through heat exchange by the heat exchanger 4, the transmission oil temperature Dt increases according to the quantity Q of heat and the heat capacity $C_{T/M}$ of the second oil 6. Where the amount of change of the transmission oil temperature Dt is represented by ΔDt, the amount $\Delta v_{T/M}$ of change of the kinetic viscosity of the second oil 6 is determined from the amount ΔDt of change of the transmission oil temperature Dt and the characteristics of the second oil 6 shown in FIG. 5. Further, the amount $\Delta TL_{T/M}$ of reduction of the loss torque of the transmission 3 is determined from the amount $\Delta v_{T/M}$ of change of the kinetic viscosity of the second oil 6 and the loss torque sensitivity Tan β of the transmission 3.

In the vehicular drive system 1 of this embodiment, during heat exchange in the heat exchanger 4 per unit time, the magnitude of the amount $\Delta TL_{T/M}$ of reduction of the loss torque of the transmission 3 according to a reduction $\Delta v_{T/M}$ of the kinetic viscosity caused by a temperature rise of the second oil 6 is larger than the magnitude of the amount $\Delta TL_{ENG}$ of increase of the loss torque of the engine 2 according to an increase $\Delta v_{ENG}$ of the kinetic viscosity caused by a temperature reduction of the first oil 5, as will be explained with reference to FIG. 6. FIG. 6 shows the amount $\Delta TL_{ENG}$ of increase of the loss torque of the engine 2 and the amount $\Delta TL_{T/M}$ of reduction of the loss torque of the transmission 3 resulting from heat exchange in the heat exchanger 4. It will be understood from FIG. 6 that the magnitude of the amount $\Delta TL_{T/M}$ of reduction of the loss torque of the transmission 3 is larger than the magnitude of the amount $\Delta TL_{ENG}$ of increase of the loss torque of the engine 2 due to heat exchange, when these magnitudes are compared in the same period during heat exchange by the heat exchanger 4. Namely, at each point in time in FIG. 6, the magnitude $|\Delta TL_{T/M}|$ of the amount $\Delta TL_{T/M}$ of reduction of the loss torque of the transmission 3 is larger than the magnitude $|\Delta TL_{ENG}|$ of the amount $\Delta TL_{ENG}$ of increase of the loss torque of the engine 2. Although this relationship in magnitude may not be temporarily satisfied in some periods, the integral value (area) of the amount $\Delta TL_{T/M}$ of reduction of the loss torque of the transmission 3 is larger than the integral value (area) of the amount $\Delta TL_{ENG}$ of increase of the loss torque of the engine 2, when these values are compared in a period having a given length or greater. Accordingly, the vehicular drive system 1 of this embodiment can reduce the overall or total loss torque $TL_{TTL}$ as the sum of the loss torque $TL_{ENG}$ of the engine 2 and the loss torque $TL_{T/M}$ of the transmission 3.

In FIG. 7, the amount $\Delta TL_{TTL}$ of change of total loss torque resulting from heat exchange in the heat exchanger 4 is shown. The amount $\Delta TL_{TTL}$ of change of the total loss torque is the amount of increase or reduction of the total loss torque of the engine 2 and the transmission 3 when heat exchange is performed by the heat exchanger 4, relative to the total loss torque of the engine 2 and the transmission 3 when no heat exchange is performed by the heat exchanger 4. The amount $\Delta TL_{TTL}$ of change of the total loss torque is the sum of the amount $\Delta TL_{ENG}$ of increase of the loss torque of the engine 2 caused by heat exchange and the amount $\Delta TL_{T/M}$ of reduction of the loss torque of the transmission 3 caused by heat exchange. As is understood from FIG. 7, heat exchange in the heat exchanger 4 makes it possible to reduce the total loss torque $TL_{TTL}$ as a combination of a loss of the engine 2 and a loss of the transmission 3. Thus, in the vehicular drive system 1 of this embodiment, heat exchange in the heat exchanger 4 makes it possible to reduce the loss torque $TL_{TTL}$ of the whole system including the engine 2 and the transmission 3.

Thus, the vehicular drive system 1 is characterized in that the magnitude of the amount $\Delta TL_{T/L}$ of reduction of the loss torque of the transmission 3 due to a temperature rise of the second oil 6 caused by heat exchange in the heat exchanger 4 is larger than the magnitude of the amount $\Delta TL_{ENG}$ of increase of the loss torque of the engine 2 due to a temperature reduction of the first oil 5 caused by heat exchange in the heat exchanger 4. In the following description, this characteristic will be called "specified characteristic". In the vehicular drive system 1 having the specified characteristic, when heat is transferred from the first oil 5 to the second oil 6 through heat exchange in the heat exchanger 4 during operation of the engine 2, the total loss torque $TL_{TTL}$ as the sum of the loss torque of the engine 2 and the loss torque of the transmission 3 is reduced.

In the vehicular drive system 1 of this embodiment, the loss torque sensitivity Tan β of the transmission 3 is larger than the loss torque sensitivity Tan α of the engine 2, as shown in FIG. 2, as an element that realizes the specified characteristic. Also, in the vehicular drive system 1 of this embodiment, the magnitude of the amount ΔDt of change of the transmission oil temperature Dt exceeds the magnitude of the amount ΔDe of change of the engine oil temperature De, as shown in FIG. 3, as another element that realizes the specified characteristic. To achieve this relationship between the change amounts ΔDe, ΔDt, it is preferable to make the amount of the first oil 5 larger than the amount of the second oil 6. In the vehicular drive system 1 of this embodiment, the magnitude of the amount $\Delta v_{T/M}$ of change of the kinetic viscosity of the second oil 6 due to heat exchange in the heat exchanger 4 is larger than the magnitude of the amount $\Delta v_{ENG}$ of change of the kinetic viscosity of the first oil 5 due to heat exchange in the heat exchanger 4, as shown in FIG. 4. The oils 5, 6 having the correspondence relationships between the oil temperature and the kinetic viscosity, which realize the specified characteristic, may also be used.

According to the vehicular drive system 1 of this embodiment, increase of the engine coolant temperature during warm-up is less likely or unlikely to be curbed, as will be described with reference to FIG. 8. In FIG. 8, the horizontal axis indicates time [sec], and the vertical axis indicates the temperature [° C.] of the coolant of the engine 2. As a means for promoting increase of the transmission oil temperature Dt, it may be considered to cause heat exchange between the coolant 9 and the second oil 6, instead of providing the heat exchanger 4. However, in this case, increase of the engine coolant temperature will be curbed. As a result, the start time of control for saving fuel consumption in the engine 2 may be delayed. In the vehicular drive system 1 of this embodiment, on the other hand, no device that exchanges heat between the coolant 9 and the second oil 6 is provided. Thus, increase of the engine coolant temperature is less likely or unlikely to be curbed, namely, the engine coolant temperature is more likely to be increased.

FIG. 8 shows the engine coolant temperature Dw1 in the vehicular drive system 1 of this embodiment, and the engine coolant temperature Dw0 in a drive system in which the heat exchanger 4 of the vehicular drive system 1 is omitted. In a region surrounded by an ellipse of a broken line in FIG. 8, namely, during warm-up, a difference between the engine coolant temperature Dw1 of the vehicular drive system 1 and the engine coolant temperature Dw0 of the drive system having no heat exchanger is small. Thus, the vehicular drive system 1 of to this embodiment makes it possible to curb or prevent delay of the start time of control for saving fuel consumption in the engine 2, and thus curb reduction of the fuel economy.

Referring to FIG. 9 through FIG. 11, a more specific example of the configuration of the vehicular drive system 1 will be described. A vehicular drive system 11 shown in FIG. 9 is a drive system for a hybrid vehicle (HV). The vehicular drive system 11 has a first rotating electric machine MG1 and a second rotating electric machine MG2 as shown in FIG. 11, as power sources, in addition to the engine 2 shown in FIG. 9. The first rotating electric machine MG1 is located between the engine 2 and the transmission 3, for example. The second rotating electric machine MG2 is located closer to the drive wheels than to the transmission 3, for example.

As shown in FIG. 9, the vehicular drive system 11 has a liquid-cooling-type oil cooler 12. The oil cooler 12 exchanges heat between the second oil 6 and a transmission coolant 10. The transmission coolant 10 is a coolant that flows in a circulation pathway that is different from a circulation pathway of the coolant 9 of the engine 2. The transmission coolant 10 cools inverters, etc. of the rotating electric machines MG1, MG2. The coolant 9 of the engine 2 and the transmission coolant 10 are cooled by a common radiator, for example.

As shown in FIG. 10, the engine 2 includes a main oil hole 21, cylinder heat 22, oil pan 23, strainer 24, first oil pump 25, oil filter 26, and so forth. The first oil pump 25 pumps up the first oil 5 stored in the oil pan 23, and delivers it toward the cylinder head 22 and the main oil hole 21. The first oil pump 25 is a mechanical oil pump driven by rotation of the engine 2, for example, but may be an electric oil pump.

The engine 2 is provided with an engine oil passage 13. The engine oil passage 13 includes an intake oil passage 13*a*, discharge oil passage 13*b*, first branch oil passage 13*c*, and a second branch oil passage 13*d*. The intake oil passage 13*a* connects the oil pan 23 and the first oil pump 25. The discharge oil passage 13*b* is connected to a discharge port of the first oil pump 25. The discharge oil passage 13*b* branches into the first branch oil passage 13*c* and the second branch oil passage 13*d*. The first oil pump 25 feeds the first oil 5 under pressure to the main oil hole 21 and the cylinder head 22 via the engine oil passage 13.

The strainer 24 is disposed in the intake oil passage 13*a*. The strainer 24 removes foreign matters, etc. in the first oil 5 pumped up by the first oil pump 25. The oil filter 26 is disposed in the discharge oil passage 13*b*. The oil filter 26 removes contaminants, etc. of the first oil 5.

The first oil 5 supplied to the main oil hole 21 via the first branch oil passage 13*c* is fed to oil jets, crank system, timing chain, and so forth. The first oil 5 supplied from the oil jets to pistons finally flows into the oil pan 23. The first oil 5 supplied to the crank system flows from a connection rod, etc. into the oil pan 23. The first oil 5 supplied to the timing chain flows from a chain tensioner into the oil pan 23.

The first oil 5 supplied to the cylinder head 22 via the second branch oil passage 13*d* is fed to the variable valve train and camshafts. The variable valve train is driven by the hydraulic pressure of the first oil 5 so as to change opening/closing timing, etc. of valves. The first oil 5 used for lubricating an exhaust camshaft and an intake camshaft finally flows into the oil pan 23.

The heat exchanger 4 is connected to the downstream side of the oil filter 26 in the engine oil passage 13 as viewed in the direction of flow of the first oil 5. The heat exchanger 4 of this embodiment is connected between the oil filter 26 in the engine oil passage 13, and a portion of the engine oil passage 13 which branches into the first branch oil passage 13*c* and the second branch oil passage 13*d*. In other words, the heat exchanger 4 exchanges heat between the first oil 5 that has been filtered by the oil filter 26, and the second oil 6. For example, the heat exchanger 4 is connected immediately downstream of the oil filter 26 in the discharge oil passage 13*b*. Since the heat exchanger 4 is connected to the discharge oil passage 13*b* having a large quantity of flow of oil in the engine oil passage 13, the quantity of heat dissipated from the first oil 5, in other words, the quantity of heat exchanged, is increased. Accordingly, the total loss torque $TL_{TTL}$ of the vehicular drive system 11 is reduced. Also, since the heat exchanger 4 is connected to the downstream side of the oil filter 26, the quantity of heat dissipated can be increased, and a pressure loss can be reduced, as will be described later.

The quantity Q of heat dissipated from the first oil 5 in the heat exchanger 4 is expressed by the following equation (4). In this equation, K is a heat transfer coefficient, V is the flow velocity of the first oil 5, and ΔTMP is a temperature difference between the first oil 5 and the second oil 6.

$$Q = K \times V \times \Delta TMP \tag{4}$$

The heat transfer coefficient K is expressed by the following equation (5). In this equation, h1 is a low-temperature-side heat transfer rate, h2 is a high-temperature-side heat transfer rate, t is the thickness of a heat-transfer part, λ is a coefficient of thermal conductivity, and f is a contamination coefficient.

$$K = ((1/h1) + (t/\lambda) + (1/h2) + f)^{-1} \tag{5}$$

Since the heat exchanger 4 is connected immediately downstream of the oil filter 26, abrasion powder, or the like, is less likely or unlikely to flow into the heat exchanger 4; therefore, the contamination coefficient f is reduced, and clogging of the heat exchanger 4 is prevented. With the contamination coefficient f thus reduced, the quantity Q of heat dissipated can be increased, and the pressure loss can be reduced. Also, since the heat exchanger 4 is connected to the discharge oil passage 13*b*, the length of a pipe from the heat exchanger 4 to the transmission 3 can be reduced.

In FIG. 11, oil passages on the transmission 3 side are shown. The transmission 3 includes an oil pan 31, second oil pump 32, planetary unit 33, and a transmission oil passage 34. The transmission oil passage 34 is a passage of the second oil 6 provided in the transmission 3. The second oil 6 stored in the oil pan 31 flows into an intake oil passage 34*a* via a strainer. The planetary unit 33 is a constituent element of the transmission 3, and may be a power split device that splits power, for example. The transmission oil passage 34 has the intake oil passage 34*a*, discharge oil passage 34*b*, first branch oil passage 34*c*, and a second branch oil passage 34*d*. The intake oil passage 34*a* connects the oil pan 31 and an intake port of the second oil pump 32. The discharge oil passage 34*b* is connected to a discharge port of the second oil pump 32. The discharge oil passage 34*b* branches into the first branch oil passage 34*c* and the second branch oil passage 34*d*. The first branch oil passage 34*c* is connected to the oil cooler 12. The second branch oil passage 34*d* is connected to the planetary unit 33. The second oil 6 fed to the second branch oil passage 34*d* is also supplied to parts to be lubricated other than the planetary unit 33. The second oil 6, which has lubricated the parts to be lubricated including the planetary unit 33, flows into the oil pan 31.

The second oil pump 32 feeds the second oil 6 under pressure, via the transmission oil passage 34. The second oil pump 32 of this embodiment feeds the second oil 6 under pressure, to parts to be lubricated and parts to be cooled, such as the planetary unit 33, first rotating electric machine MG1 and the second rotating electric machine MG2, via the transmission oil passage 34. While the second oil pump 32 is an oil pump mechanically driven by the drive shaft, or the like, an electric oil pump may be used instead. The second oil 6 discharged from the second oil pump 32 to the discharge oil passage 34b and supplied to the planetary unit 33 lubricates the planetary unit 33. Also, the second oil 6 supplied from the discharge oil passage 34b to the oil cooler 12 is cooled by the oil cooler 12. The second oil 6 thus cooled is supplied to the first rotating electric machine MG1 and the second rotating electric machine MG2, so as to cool the rotating electric machines MG1, MG2. Namely, the rotating electric machines MG1, MG2 are located downstream of the oil cooler 12 in the flow passage of the second oil 6. The second oil 6 that has cooled the rotating electric machines MG1, MG2 flows into the oil pan 31.

The oil cooler 12 has an electric oil pump 12a. The electric oil pump 12a causes the second oil 6 to flow through the oil cooler 12. The vehicular drive system 11 has an ECU 50. The ECU 50 is an electronic control unit having a computer. The ECU 50 is connected to the electric oil pump 12a and an oil temperature sensor 51. The oil temperature sensor 51 detects the temperature of the second oil 6, for example, detects the oil temperature of the second oil 6 in the transmission oil passage 34. A signal indicative of the oil temperature detected by the oil temperature sensor 51 is transmitted to the ECU 50.

When the oil temperature of the second oil 6 detected by the oil temperature sensor 51 is equal to or higher than a specified temperature, the ECU 50 operates the electric oil pump 12a, and supplies the second oil 6 cooled by the oil cooler 12, to the rotating electric machines MG1, MG2. More specifically, when the oil temperature of the second oil 6 is equal to or higher than the specified temperature, the ECU 50 outputs an operation command to the electric oil pump 12a. The electric oil pump 12a operates in response to the command from the ECU 50, and causes the second oil 6 to flow from the second oil pump 32 side toward the rotating electric machines MG1, MG2. The second oil 6 exchanges heat with the transmission coolant 10 while flowing through the oil cooler 12, so as to be cooled. Accordingly, the second oil 6 that has been cooled by the oil cooler 12 is supplied to the rotating electric machines MG1, MG2, so as to cool the rotating electric machines MG1, MG2. The specified temperature may be a threshold value based on which it is determined whether cooling of the second oil 6 is started. For example, the specified temperature may be a warm-up completion temperature of the transmission 3. Also, the specified temperature may be a threshold value based on which it is determined whether the first rotating electric machine MG1 and the second rotating electric machine MG2 need to be cooled. The specified temperature may be set to a temperature in the range of 80° C. to 90° C., as one example.

Control on the electric oil pump 12a is not limited to switching between START (ON) and STOP (OFF). When the temperature Dt of the second oil 6 is lower than a specified temperature, the ECU 50 may control the electric oil pump 12a so that the discharge amount of the electric oil pump 12a is reduced to be smaller than that in the case where the temperature Dt of the second oil 6 is equal to or higher than the specified temperature. The discharge amount of the electric oil pump 12a may be reduced by stopping the electric oil pump 12a. If the discharge amount of the electric oil pump 12a is increased as the temperature Dt of the second oil 6 rises, the first rotating electric machine MG1 and the second rotating electric machine MG2 can be appropriately cooled.

The heat exchanger 4 is connected to the transmission oil passage 34, and exchanges heat between the first oil 5 and the second oil 6 flowing through the transmission oil passage 34. The heat exchanger 4 of the vehicular drive system 11 is connected to the discharge oil passage 34b as a part of the transmission oil passage 34, and exchanges heat between the first oil 5 and the second oil 6 flowing through the discharge oil passage 34b. Namely, the heat exchanger 4 is connected to the upstream side of the oil cooler 12 in the flow passage of the second oil 6, in other words, between the second oil pump 32 and the oil cooler 12. When an oil filter is disposed in the discharge oil passage 34b, the heat exchanger 4 is preferably connected to a point immediately downstream of the oil filter. With the heat exchanger 4 thus connected to the discharge oil passage 34b, the temperature of the second oil 6 supplied to respective parts of the transmission 3 (transmission oil temperature Dt) can be promptly raised. It may be considered to provide the heat exchanger 4 in the oil pan 31, so that heat is exchanged between the second oil 6 in the oil pan 31 and the first oil 5. In this case, however, the temperature of the second oil 6 supplied to the parts of the transmission 3 to be lubricated is limited to the temperature of the oil in the oil pan 31. On the other hand, when the heat exchanger 4 is connected to the transmission oil passage 34, the temperature of the second oil 6 supplied to the parts to be lubricated can be promptly raised. Even before the oil temperature in the oil pan 31 is sufficiently elevated, the second oil 6 having an appropriate temperature can be supplied to the parts to be lubricated, such as the planetary unit 33. Accordingly, the vehicular drive system 11 can promptly reduce the total loss torque $TL_{TTL}$ of the whole system including the engine 2 and the transmission 3.

Referring to FIG. 12 through FIG. 15, reduction of loss, etc. in the vehicular drive system 11 for the hybrid vehicle will be described. As shown in FIG. 12, through heat exchange by the heat exchanger 4, the engine oil temperature De is reduced, whereas the transmission oil temperature Dt is increased. In the vehicular drive system 11, the magnitude of the amount $\Delta Dt$ of increase of the transmission oil temperature due to heat exchange exceeds the magnitude of the amount $\Delta De$ of reduction of the engine oil temperature due to heat exchange.

Also, as shown in FIG. 13, the magnitude of the amount $\Delta v_{T/M}$ of change of the kinetic viscosity of the second oil 6 resulting from heat exchange in the heat exchanger 4 is larger than the magnitude of the amount $\Delta v_{ENG}$ of change of the kinetic viscosity of the first oil 5. As a result, the total loss WL is reduced, as shown in FIG. 14. The total loss WL[W] is the sum of losses associated with vehicle driving, including a loss in the power transmission system including the engine 2 and the transmission 3, drag loss of the rotating electric machines MG1, MG2 located downstream of the heat exchanger 4, and a stirring loss caused by a planetary gear and a differential gear. In the first rotating electric machine MG1 and the second rotating electric machine MG2, the drag loss arises since the rotors rotate in the second oil 6. Also, the stirring loss arises since a ring gear of the planetary gear and the differential gear rotate in the second oil 6. The drag loss and the stirring loss change according to the transmission oil temperature Dt, and values of drag loss and stirring loss in the case where the transmission oil temperature Dt is high are smaller than values of drag loss and stirring loss in the case where the transmission oil temperature Dt is low. In FIG. 14, solid line WL0 indicates the total loss WL in the drive system that does not have the heat exchanger 4, and broken line WL1 indicates the total loss WL in the vehicular drive system 11 having the heat exchanger 4. Also, ΔWL is the amount of change of the total loss WL due to the presence or absence of the heat exchanger 4. As is understood from FIG. 14, the total loss WL is reduced because of the provision of the heat exchanger 4. As shown in FIG. 15, in the vehicular drive system 11 for the hybrid vehicle, too, increase of the coolant temperature of the engine 2 is not curbed.

As explained above, in the vehicular drive system 1 according to this embodiment, the magnitude of the amount ($\Delta TL_{T/M}$) of reduction of the loss torque of the transmission 3 according to reduction ($\Delta v_{T/M}$) of the kinetic viscosity due to a temperature rise ($\Delta Dt$) of the second oil 6, in heat exchange per unit time in the heat exchanger 4, exceeds the magnitude of the amount ($\Delta TL_{ENG}$) of increase of the loss torque of the engine 2 according to increase ($\Delta v_{ENG}$) of the kinetic viscosity due to a temperature reduction ($\Delta De$) of the first oil 5. Thus, according to the vehicular drive system 1 of this embodiment, the loss of the power train including the engine 2 and the transmission 3 can be reduced.

For example, the temperature rise ($\Delta Dt$) of the second oil 6 in this embodiment is the amount of increase of the average oil temperature of the second oil 6 in the transmission 3. The temperature rise ($\Delta Dt$) of the second oil 6 may be the amount of increase of the average oil temperature of the second oil 6 in the transmission oil passage 34. The temperature rise ($\Delta Dt$) of the second oil 6 may be the amount of increase of the temperature Dt of the second oil 6 flowing out from the heat exchanger 4.

For example, the temperature reduction ($\Delta De$) of the first oil 5 in this embodiment is the amount of reduction of the average oil temperature of the first oil 5 in the engine 2. The temperature reduction ($\Delta De$) of the first oil 5 may be the amount of reduction of the average oil temperature of the first oil 5 in the engine oil passage 13. The temperature drop ($\Delta De$) of the first oil 5 6 may be the amount of reduction of the temperature De of the first oil 5 flowing out from the heat exchanger 4.

According to the vehicular drive system 1 of this embodiment, increase of the transmission oil temperature Dt is promoted, and lock-up or flex lock-up can be promptly started in the torque converter 7. Also, since heat is exchanged between the engine oil and the transmission oil, the temperature of the coolant 9 is not prevented from rising. If the engine oil temperature De is saturated (for example, 80° C. to 90° C.), the transmission oil temperature Dt also stops rising. Accordingly, the transmission oil temperature Dt does not excessively rise, and no mechanism or control for detaching or separating the heat exchanger 4 from the system is needed.

In the vehicular drive system 11, the oil cooler 12 may be omitted. Namely, the second oil 6 that has been subjected to heat exchange in the heat exchanger 4 may be supplied directly to the first rotating electric machine MG1 and the second rotating electric machine MG2. Also, the vehicular drive system 11 may include either one of the first rotating electric machine MG1 and the second rotating electric machine MG2.

Figure 16:
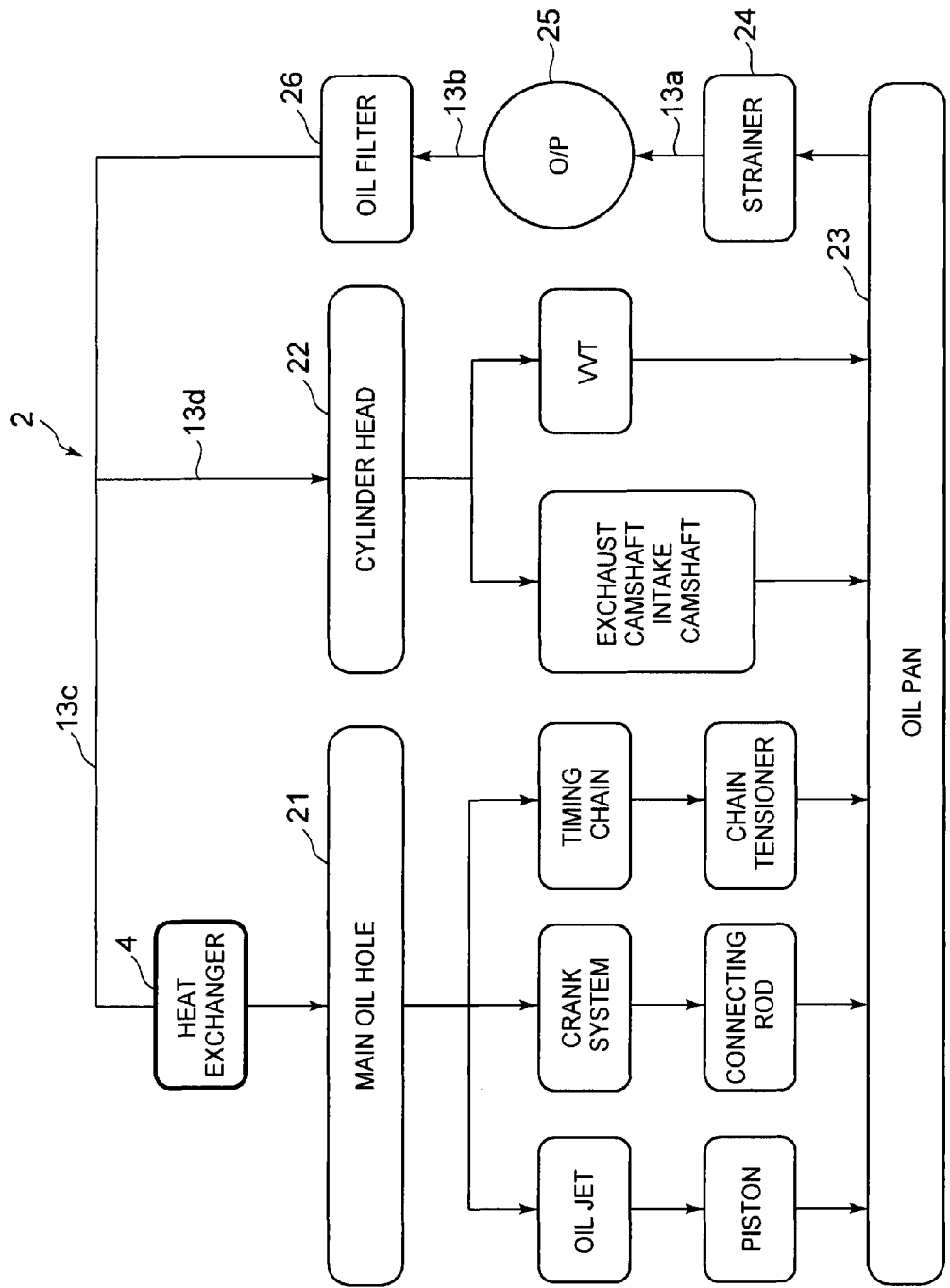
FIG. 16 is a view showing the location of connection of a heat exchanger on the engine side according to a first modified example of the first embodiment.
Figure 17:
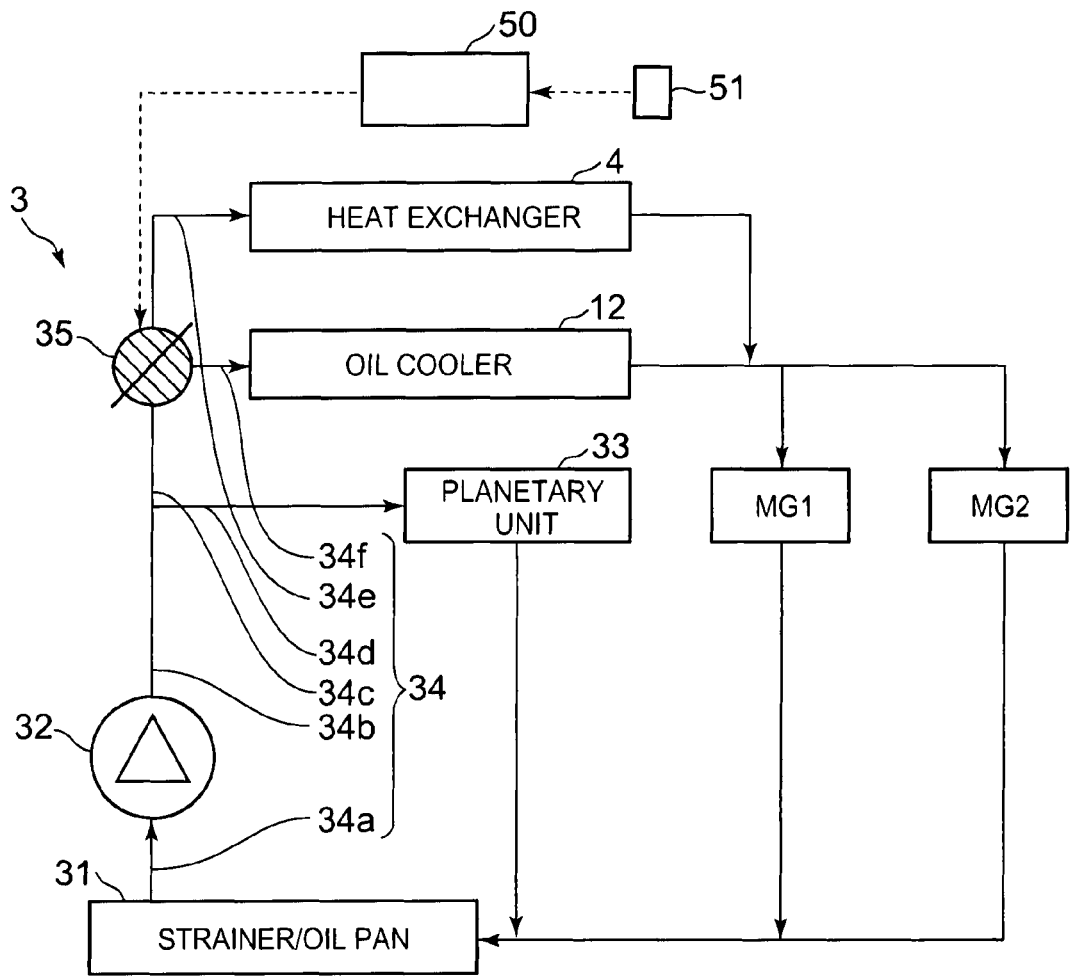
FIG. 17 is a view showing the location of connection of the heat exchanger on the transmission side according to the first modified example of the first embodiment.
Figure 18:
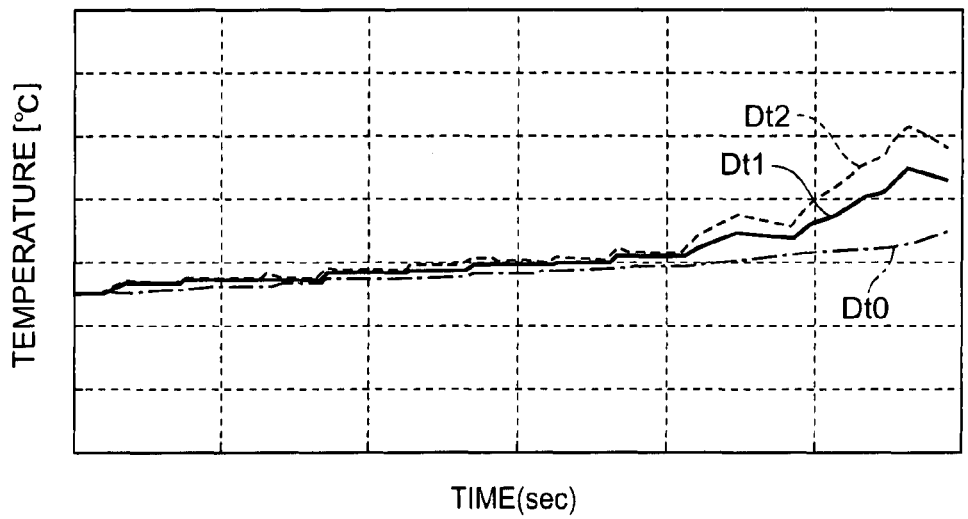
FIG. 18 is a view useful for explaining changes in the oil temperatures with time in the first modified example of the first embodiment.

[First Modified Example of First Embodiment] A first modified example of the first embodiment will be described. FIG. 16 is a view showing the location of connection of the heat exchanger on the engine side according to the first modified example of the first embodiment. FIG. 17 is a view showing the location of connection of the heat exchanger on the transmission side according to the first modified example of the first embodiment. FIG. 18 is a view useful for explaining changes in the oil temperatures with time. The first modified example is different from the above-described first embodiment in that the heat exchanger 4 is connected to the first branch oil passage 13c on the engine 2 side, and the heat exchanger 4 is connected in parallel with the oil cooler 12 on the transmission 3 side.

As shown in FIG. 16, the heat exchanger 4 is connected to the first branch oil passage 13c of the engine oil passage 13. The flow rate of the first oil 5 in the first branch oil passage 13c is smaller than the flow rate of the first oil 5 in the discharge oil passage 13b. With the arrangement of the first modified example, a pressure loss in the heat exchanger 4 is reduced, as compared with the first embodiment. Which portion of the engine oil passage 13 to which the heat exchanger 4 is to be connected may be determined by comparing the amount of increase of loss due to the pressure loss of the heat exchanger 4, with the amount of reduction of loss due to reduction of the total loss torque $TL_{TTL}$ resulting from heat exchange.

As shown in FIG. 17, the first branch oil passage 34c of the transmission oil passage 34 is connected to a third branch oil passage 34e and a fourth branch oil passage 34f via a flow control valve 35. The third branch oil passage 34e is connected to the heat exchanger 4. The fourth branch oil passage 34f is connected to the oil cooler 12. The second oil 6 that has passed through the heat exchanger 4 and the second oil 6 that has passed through the oil cooler 12 are supplied to the first rotating electric machine MG1 and the second rotating electric machine MG2. Namely, the rotating electric machines MG1, MG2 are located downstream of the oil cooler 12 and the heat exchanger 4 in the flow passage of the second oil 6. The oil cooler 12 of this modified example may not be provided with the electric oil pump 12a.

The flow control valve 35 controls the flow rates of the second oil 6 supplied to the heat exchanger 4 and the oil cooler 12. The flow control valve 35 of this modified example can set the ratio of the flow rate of the second oil 6 supplied to the heat exchanger 4 and the flow rate of the second oil 6 supplied to the oil cooler 12, to a desired ratio. The flow control valve 35 is, for example, an electromagnetic valve. The flow control valve 35 may set the flow rate of the second oil 6 supplied to the heat exchanger 4 to zero, so that the entire amount of the second oil 6 in the first branch oil passage 34c is supplied to the oil cooler 12, or may set the flow rate of the second oil 6 supplied to the oil cooler 12 to zero, so that the entire amount of the second oil 6 in the first branch oil passage 34c is supplied to the heat exchanger 4.

The ECU 50 controls the flow control valve 35. When the temperature Dt of the second oil 6 detected by the oil temperature sensor 51 is equal to or higher than a specified temperature, the ECU 50 makes the flow rate of the second oil 6 supplied to the heat exchanger 4 smaller than the flow rate of the second oil 6 supplied to the oil cooler 12. Thus, increase of the temperature of the second oil 6 through heat exchange of the heat exchanger 4 can be prioritized when the second oil 6 has a low temperature, and cooling of the second oil 6 by use of the oil cooler 12 can be prioritized when the second oil 6 has a high temperature. When the temperature Dt of the second oil 6 is equal to or higher than the specified temperature, the ECU 50 may inhibit the second oil 6 from flowing through the heat exchanger 4.

It is also preferable that the ECU 50 reduces the flow rate of the second oil 6 that passes through the heat exchanger 4 after completion of warm-up of the transmission 3, to a value smaller than that before completion of warm-up of the transmission 3. In this manner, the temperature Dt of the second oil 6 supplied to the rotating electric machines MG1, MG2 is prevented from excessively rising.

FIG. 18 shows the transmission oil temperature Dt0 in the drive system in which the heat exchanger 4 is not installed, the transmission oil temperature Dt1 in the case where the heat exchanger 4 is connected to the discharge oil passage 34b of the transmission oil passage 34, and the transmission oil temperature Dt2 in the case where the heat exchanger 4 is connected to the third branch oil passage 34e of the transmission oil passage 34. By controlling the flow of the second oil 6 by means of the flow control valve 35, it is possible to promote increase of the transmission oil temperature Dt2. During cold start, the second oil 6 warmed by the heat exchanger 4 can be promptly supplied to the rotating electric machines MG1, MG2. Thus, losses of the rotating electric machines MG1, MG2 each having a high sensitivity of loss to change of the kinetic viscosity ν can be reduced.

A switching valve that supplies the second oil 6 of the first branch oil passage 34c only to either one of the oil cooler 12 and the heat exchanger 4 may be provided in place of the flow control valve 35. In this case, when the temperature Dt of the second oil 6 is equal to or higher than a specified temperature, the ECU 50 switches the switching valve into a condition where the first branch oil passage 34c communicates with the fourth branch oil passage 34f, and the first branch oil passage 34c and the third branch oil passage 34e are disconnected or shut off from each other. On the other hand, when the temperature Dt of the second oil 6 is lower than the specified temperature, the ECU 50 switches the switching valve into a condition where the first branch oil passage 34c communicates with the third branch oil passage 34e, and the first branch oil passage 34c and the fourth branch oil passage 34f are disconnected or shut off from each other. With the switching valve thus operated, when the second oil 6 has a low temperature, heat dissipated from the oil cooler 12 can be minimized, and the transmission oil temperature Dt can be promptly raised. When the second oil 6 has a high temperature, the transmission oil temperature Dt is reduced by the oil cooler 12, and increase of the temperatures of the rotating electric machines MG1, MG2 is curbed, so that the EV travelling distance can be extended or increased.

The flow control valve 35 is not limited to the electromagnetic valve, but may be a thermostatic valve or a bimetallic valve, or a valve that utilizes a shape-memory alloy, for example.

Figure 19:
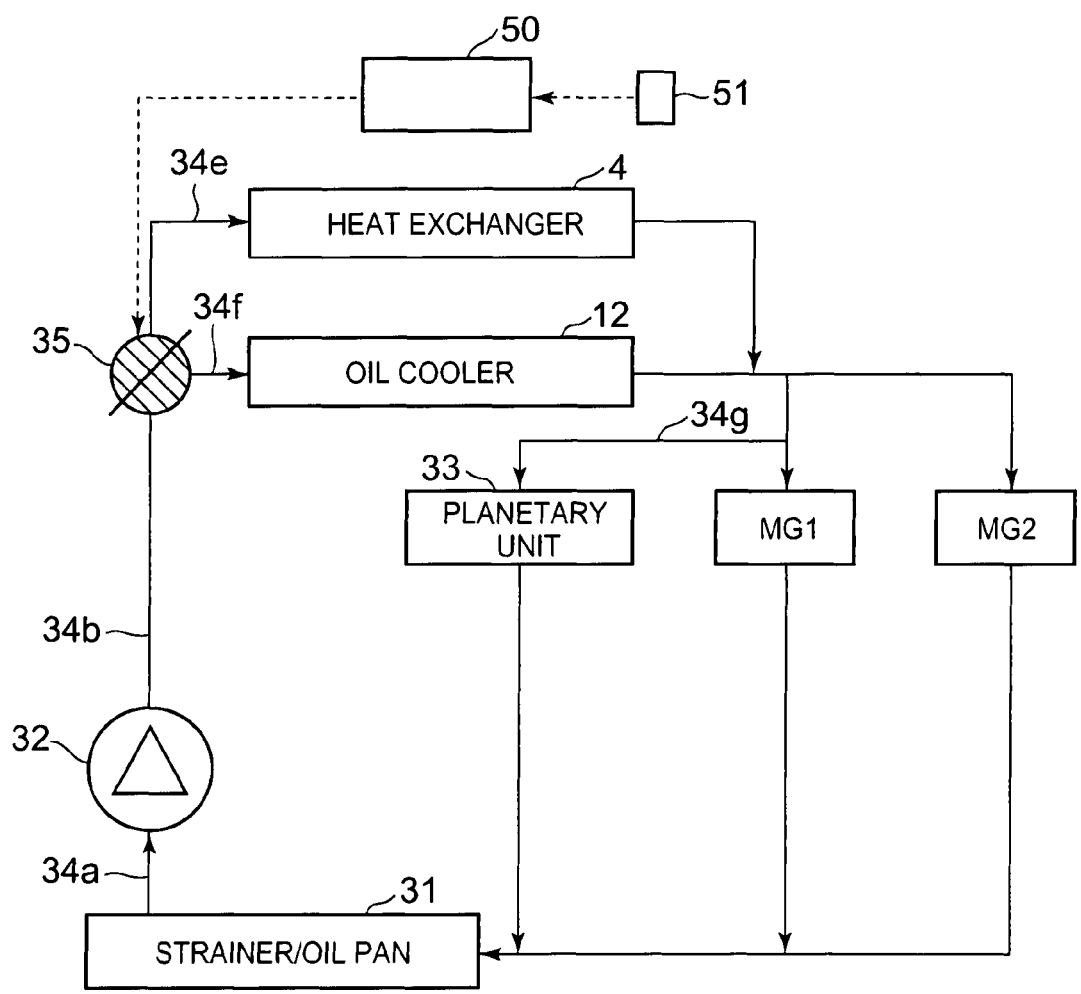
FIG. 19 is a view showing a transmission oil passage according to a second modified example of the first embodiment.

[Second Modified Example of First Embodiment] A second modified example of the first embodiment will be described. FIG. 19 is a view showing a transmission oil passage according to the second modified example of the first embodiment. The second modified example is different from the first modified example of the first embodiment in the arrangement of oil passage through which the second oil 6 is supplied to the planetary unit 33.

As shown in FIG. 19, the second oil 6 is supplied to the planetary unit 33 via a planetary oil passage 34g. The planetary oil passage 34g is connected to the outlet side of the heat exchanger 4 and the oil cooler 12. Namely, the second oil 6 that has been subjected to heat exchange in the heat exchanger 4 and the second oil 6 that has been cooled by the oil cooler 12 are supplied to the planetary unit 33 via the planetary oil passage 34g.

With the oil passage arrangement of the second modified example, the second oil 6 that has been cooled by the oil cooler 12 may be supplied to the planetary unit 33. It is, however, to be noted that, in a situation where the second oil 6 is cooled by the oil cooler 12, the temperature Dt of the second oil 6 has already been sufficiently elevated. Accordingly, even if the second oil 6 that has been cooled is supplied to the planetary unit 33, the efficiency of the transmission 3 is not substantially influenced by supply of the cooled oil.

Figure 20:
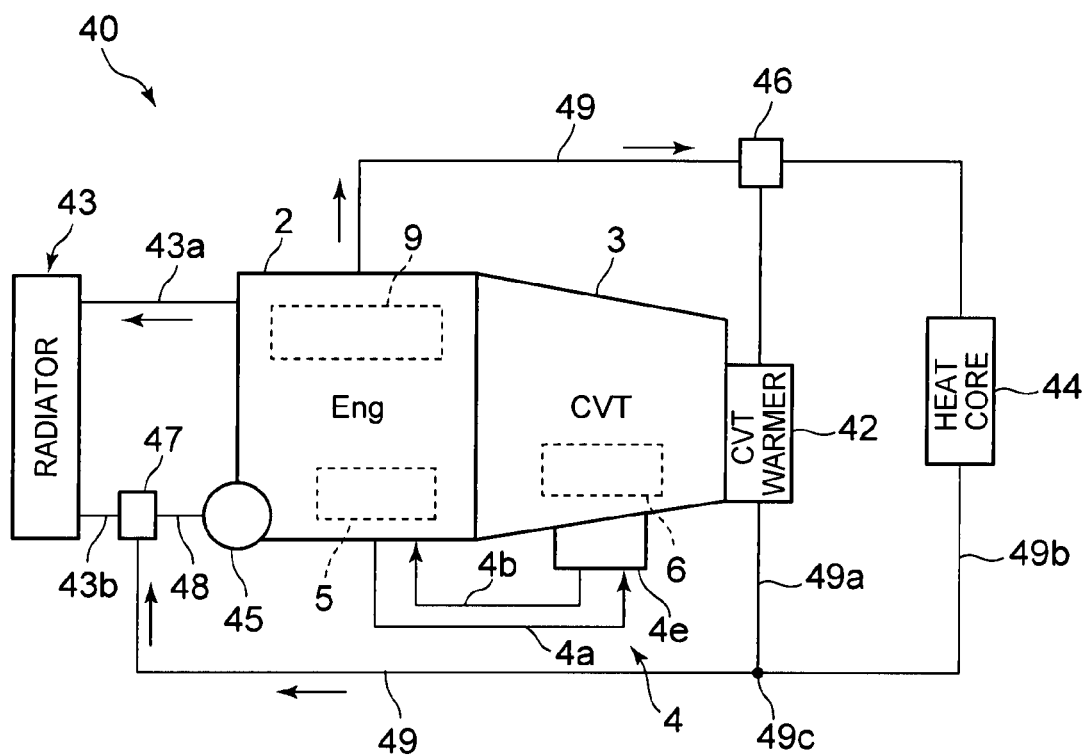
FIG. 20 is a schematic view showing the configuration of a vehicular drive system according to a second embodiment of the invention.
Figure 21:
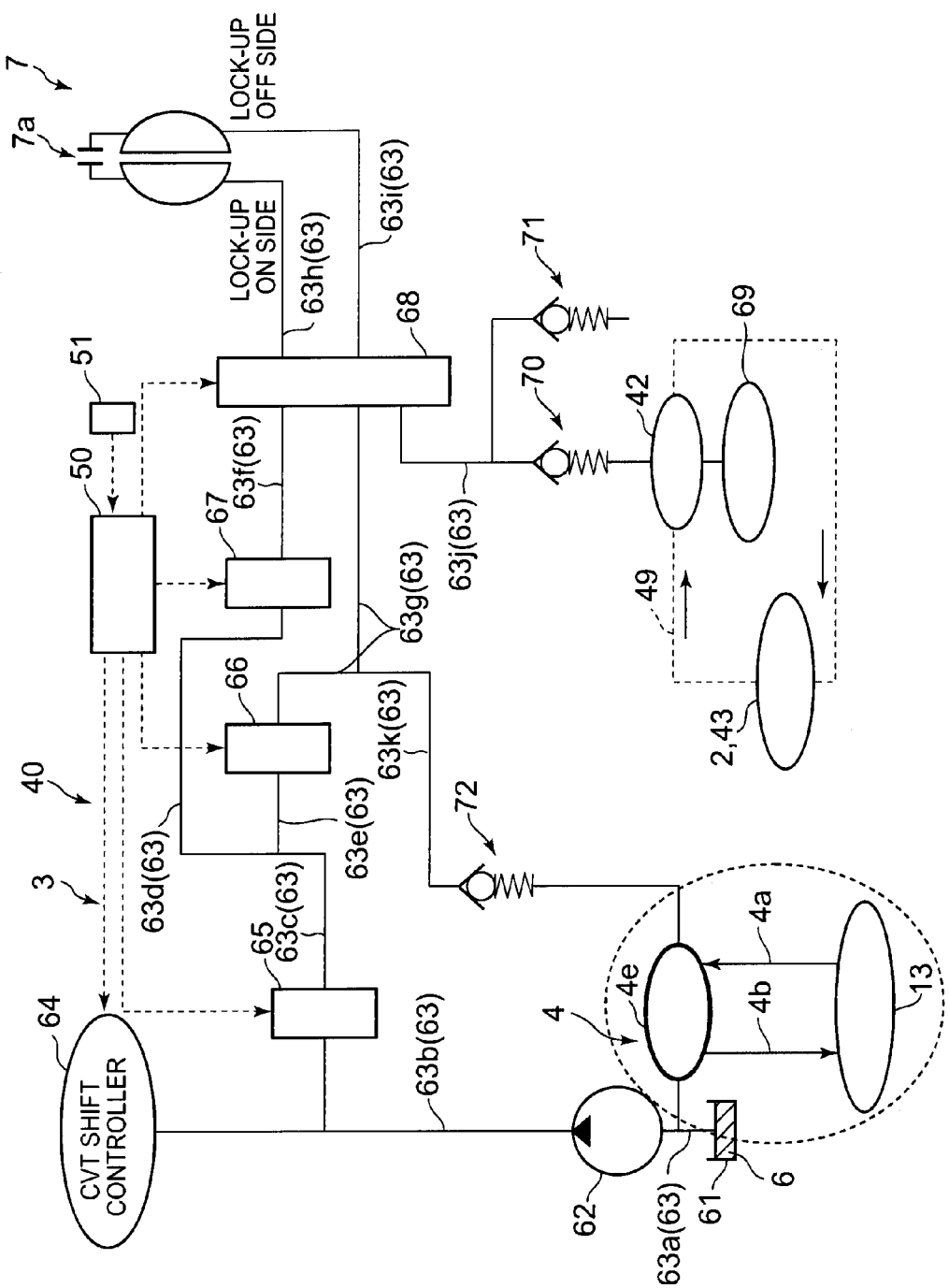
FIG. 21 is a view showing the arrangement of transmission oil passage according to the second embodiment.
Figure 22:
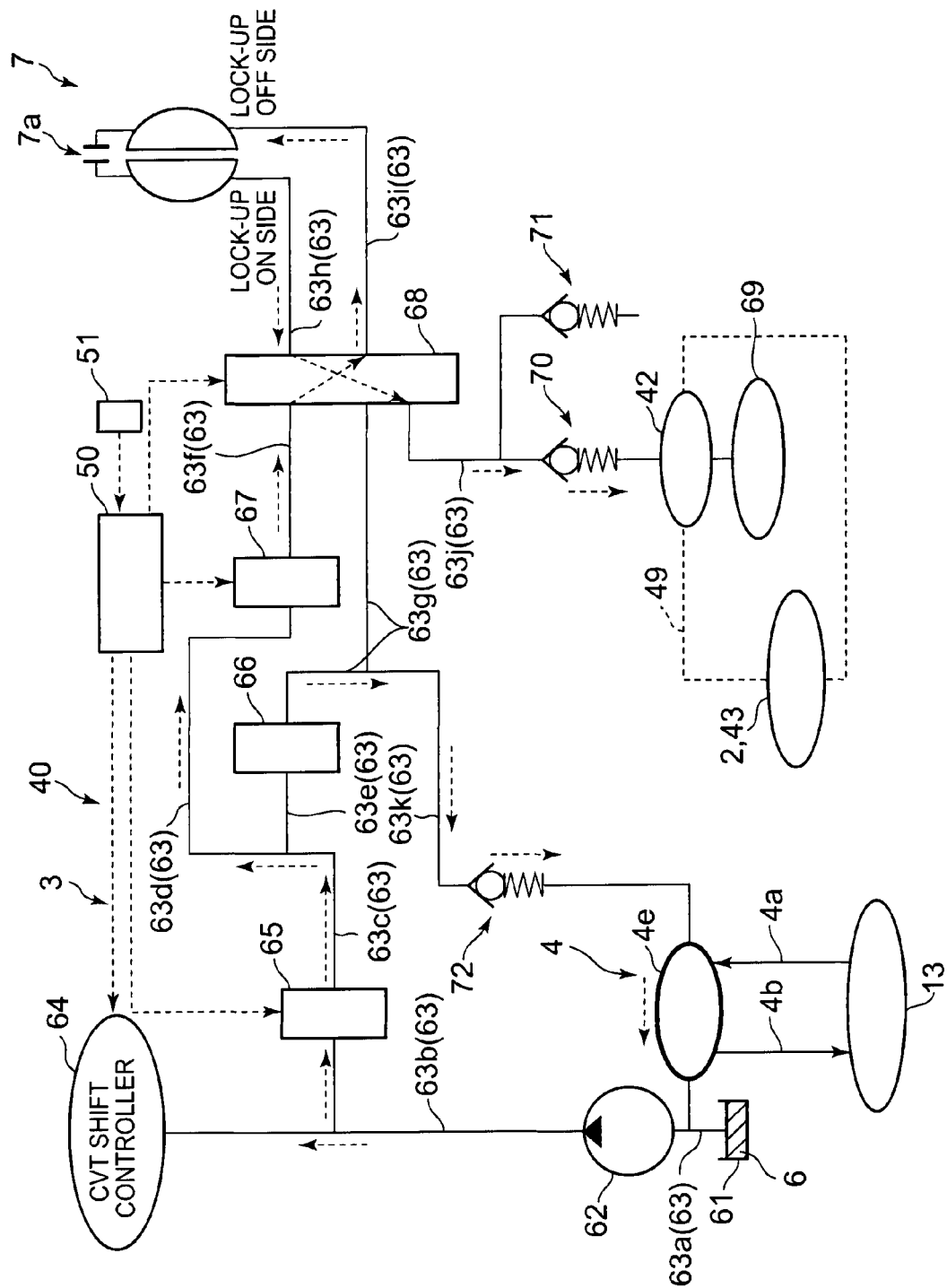
FIG. 22 is a view showing flow of oil when a lock-up clutch is released in the second embodiment.
Figure 23:
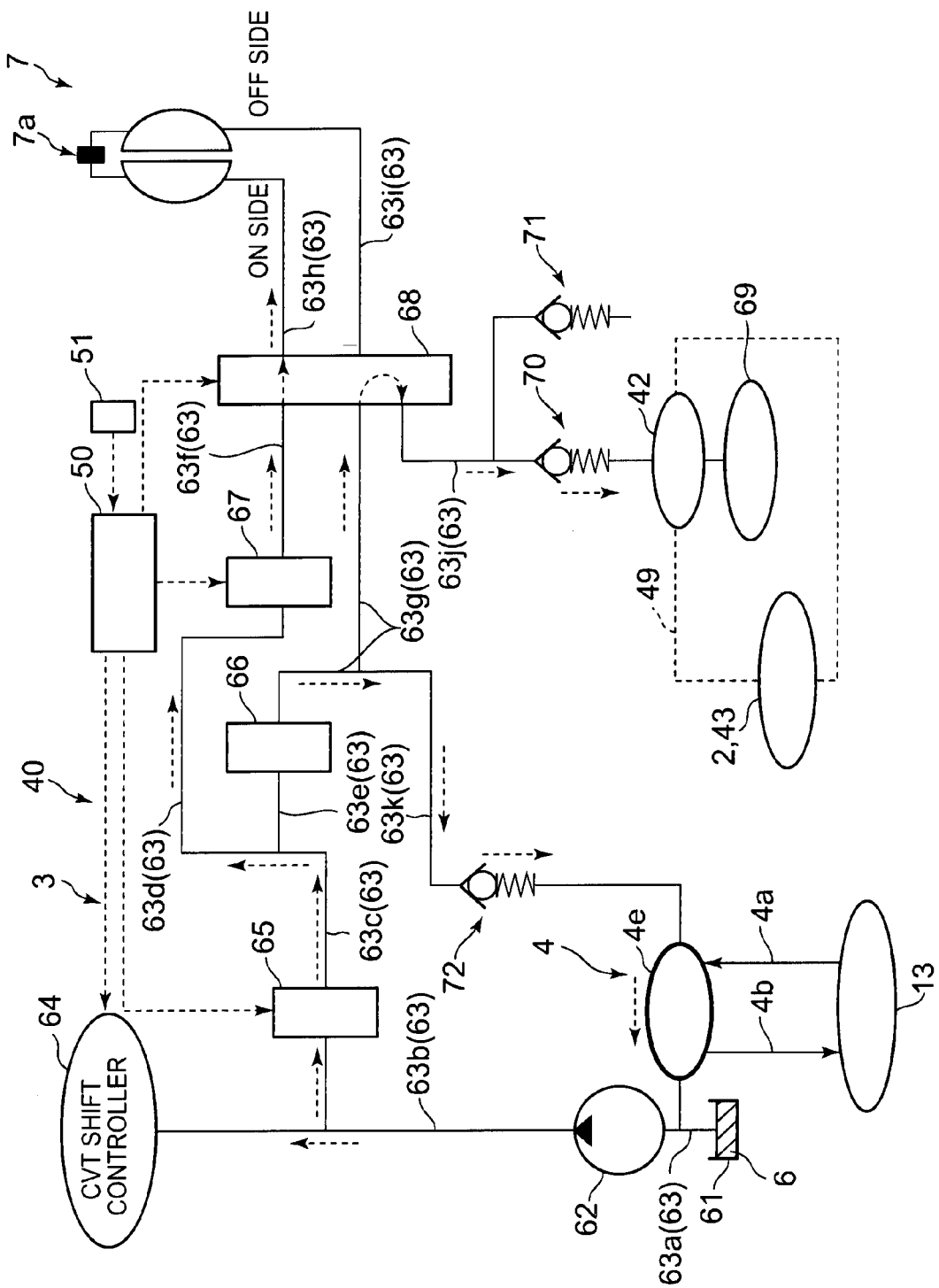
FIG. 23 is a view showing flow of oil when the lock-up clutch is engaged in the second embodiment.

Referring to FIG. 20 through FIG. 23, a second embodiment of the invention will be described. In the second embodiment, the same reference numerals are assigned to constituent elements having substantially the same functions as those as described above in the first embodiment, and repeated explanation of these elements will be omitted. FIG. 20 is a schematic view showing the configuration of a vehicular drive system according to the second embodiment. FIG. 21 is a view showing the arrangement of transmission oil passage according to the second embodiment. FIG. 22 is a view showing flow of oil when a lock-up clutch is released. FIG. 23 is a view showing flow of oil when the lock-up clutch is engaged.

In the transmission 3, the loss sensitivity to the oil temperature is high in some portions, and the loss sensitivity to the oil temperature is low in other portions. For example, a second oil pump 62 (see FIG. 21) has a high loss sensitivity to the oil temperature in the transmission 3. In the vehicular drive system 40 of this embodiment, the second oil 6 warmed by the heat exchanger 4 is preferentially supplied to the second oil pump 62. With this arrangement, a pump loss of the second oil pump 62 is reduced, and a loss of the transmission 3 during cold start is reduced, so that the fuel economy of the vehicle can be improved.

As shown in FIG. 20, the vehicular drive system 40 according to the second embodiment includes the engine 2, transmission 3, and the heat exchanger 4. The vehicular drive system 40 further includes a CVT warmer 42, radiator 43, water pump 45, first switching valve 46, and a second switching valve 47. The CVT warmer 42 causes the coolant 9 of the engine 2 and the second oil 6 to exchange heat therebetween so as to raise the temperature Dt of the second oil 6. The radiator 43 cools the coolant 9. The water pump 45 feeds the coolant 9 of an intake passage 48 into the engine 2.

A liquid passage 43a for delivering the coolant to the radiator 43, and a circulation liquid passage 49, are connected to the cylinder head of the engine 2. The first switching valve 46 is disposed in the circulation liquid passage 49. A first circulation passage 49a and a second circulation passage 49b are connected to the first switching valve 46. The first circulation passage 49a and the second circulation passage 49b are connected to each other at a junction 49c. The first switching valve 46 can be switched to one of a condition where the coolant 9 flowing from the engine 2 into the circulation liquid passage 49 flows through the first circulation passage 49a, a condition where the coolant 9 flows through the second circulation passage 49b, and a condition where the coolant 9 flows through the first circulation passage 49a and the second circulation passage 49b, for example. The first switching valve 46 may also be switched to a condition where the coolant 9 flowing from the engine 2 into the circulation liquid passage 49 is inhibited from flowing through both the first circulation passage 49a and the second circulation passage 49b.

The first circulation passage 49a is connected to the CVT warmer 42. The coolant 9 flowing into the first circulation passage 49a via the first switching valve 46 flows to the junction 49c via the CVT warmer 42. The second circulation passage 49b is connected to a heater core 44. The coolant 9 flowing into the second circulation passage 49b via the first switching valve 46 flows to the junction 49c via the heater core 44.

The second switching valve 47 is connected to a discharge liquid passage 43b of the radiator 43, intake passage 48 and the circulation liquid passage 49. The second switching valve 47 controls the flow rate of the coolant 9 that circulates between the radiator 43 and the engine 2. When the temperature of the coolant 9 is low, the second switching valve 47 shuts off communication between the discharge liquid passage 43b and the intake passage 48. As a result, the coolant 9 is inhibited from circulating between the radiator 43 and the engine 2. If the temperature of the coolant 9 rises, the second switching valve 47 communicates the discharge liquid passage 43b with the intake passage 48, so that the coolant 9 circulates between the radiator 43 and the engine 2. Also, the second switching valve 47 controls the flow rate of the coolant 9 that circulates through the circulation liquid passage 49. When the temperature of the coolant 9 is low, for example, the second switching valve 47 shuts off communication between the intake passage 48 and the circulation liquid passage 49, so that the coolant 9 circulates within the engine 2. If the temperature of the coolant 9 rises, the second switching valve 47 communicates the circulation liquid passage 49 with the intake passage 48, so as to circulate the coolant 9 through the circulation liquid passage 49.

If the circulation liquid passage 49 and the intake passage 48 are brought into communication with each other via the second switching valve 47, the coolant 9 discharged from the cylinder head of the engine 2 flows into the circulation liquid passage 49. The coolant 9 led to the first circulation passage 49a by the first switching valve 46 exchanges heat with the second oil 6 in the CVT warmer 42. In the CVT warmer 42, heat is transferred from the coolant 9 to the second oil 6, so that the temperature of the second oil 6 rises. The coolant 9 led to the second circulation passage 49b by the first switching valve 46 flows into the heater core 44. In the heater core 44, temperature control of air of an air conditioner is performed, using heat of the coolant 9.

As shown in FIG. 21, the transmission 3 includes an oil pan 61, second oil pump 61, transmission oil passage 63, and a torque converter 7. The transmission oil passage 63 includes an intake oil passage 63a, discharge oil passage 63b, first oil passage 63c, second oil passage 63d, third oil passage 63e, fourth oil passage 63f, fifth oil passage 63g, and an engagement-side supply oil passage 63h, release-side supply oil passage 63i, lubricating-system oil passage 63j, and a return oil passage 63k.

The intake oil passage 63a connects the oil pan 61 with an intake port of the second oil pump 62. The discharge oil passage 63b is connected to a discharge port of the second oil pump 62. The discharge oil passage 63b is connected to a CVT shift controller 64. The transmission 3 of the second embodiment is a continuously variable transmission (CVT). The CVT shift controller 64 controls the speed ratio and belt clamping force of the transmission 3, switching of forward and reverse driving, and so forth. A primary regulator valve 65 regulates or adjusts the hydraulic pressure of the discharge oil passage 63b to a given line pressure. The primary regulator valve 65 is connected to the discharge oil passage 63b and the first oil passage 63c. The second oil 6 that becomes redundant as a result of the pressure regulation is discharged from the primary regulator valve 65 into the first oil passage 63c.

The first oil passage 63c branches into the second oil passage 63d and the third oil passage 63e. A secondary regulator valve 66 is disposed in the third oil passage 63e.

The secondary regulator valve 66 regulates the hydraulic pressures of the first oil passage 63c, second oil passage 63d, and the third oil passage 63e. The second oil 6 that becomes redundant as a result of the pressure regulation is discharged from the secondary regulator valve 66 into the fifth oil passage 63g. A lock-up control valve 67 is disposed in the second oil passage 63d. The lock-up control valve 67 is connected to the second oil passage 63d and the fourth oil passage 63f, and controls the hydraulic pressure supplied to the fourth oil passage 63f.

A lock-up relay valve 68 controls switching of the lock-up clutch 7a between a released state and an engaged state. The lock-up relay valve 68 is connected to the fourth oil passage 63f, fifth oil passage 63g, engagement-side supply oil passage 63h, release-side supply oil passage 63i, and the lubricating-system oil passage 63j. The engagement-side supply oil passage 63h is a supply oil passage for supplying the hydraulic pressure in such a direction as to engage the lock-up clutch 7a. The hydraulic pressure supplied to the torque converter 7 via the engagement-side supply oil passage 63h produces pressing force for engaging an input-side friction engagement element of the lock-up clutch 7a with an output-side friction engagement element of the lock-up clutch 7a. For example, the hydraulic pressure supplied to the torque converter 7 via the engagement-side supply oil passage 63h presses a lock-up piston in the engaging direction.

The release-side supply oil passage 63i is a supply oil passage for supplying the hydraulic pressure in such a direction as to release the lock-up clutch 7a. The hydraulic pressure supplied to the torque converter 7 via the release-side supply oil passage 63i produces pressing force for moving the input-side friction engagement element and output-side friction engagement element of the lock-up clutch 7a away from each other. For example, the hydraulic pressure supplied to the torque converter 7 via the release-side supply oil passage 63i presses the lock-up piston in the releasing direction.

The lubricating-system oil passage 63j is connected to the CVT warmer 42 via a torque converter check valve 70. The second oil 6 that has passed through the CVT warmer 42 is supplied to a lubricating system 69 of the transmission 3. A bypass valve 71 is connected to the lubricating-system oil passage 63j. The second oil 6 that flows through the bypass valve 71 is supplied to the lubricating system 69 or the oil pan 61, for example, while bypassing the CVT warmer 42.

The ECU 50 controls the CVT shift controller 64, primary regulator valve 65, secondary regulator valve 66, lock-up control valve 67, and the lock-up relay valve 68.

The return oil passage 63k is connected to the fifth oil passage 63g. The return oil passage 63k is an oil passage that supplies the second oil 6 that becomes redundant, out of the second oil 6 that is fed under pressure by the second oil pump 62 via the transmission oil passage 63, to the intake oil passage 63a of the second oil pump 62. The return oil passage 63k connects the fifth oil passage 63g with the intake oil passage 63a. A check valve 72 is disposed in the return oil passage 63k. The check valve 72 regulates the hydraulic pressure of the fifth oil passage 63g, and supplies the second oil 6 to the CVT warmer 42 and the lubricating system 69.

The heat exchanger 4 is connected to the return oil passage 63k. Namely, the heat exchanger 4 exchanges heat between the first oil 5 that flows through the engine oil passage 13, and the second oil 6 that flows through the return oil passage 63k. The heat exchanger 4 is connected to one side of the check valve 72 closer to the intake oil passage 63a in the return oil passage 63k. In the heat exchanger 4 of this embodiment, the heat exchange part 4e is directly connected to the return oil passage 63k. Namely, the second oil 6 that flows from the fifth oil passage 63g to the return oil passage 63k via the check valve 72 flows into the heat exchange part 4e. The second oil 6 that has been subjected to heat exchange is discharged from the heat exchange part 4e into the return oil passage 63k, and flows into the intake oil passage 63a. The heat exchange part 4e is connected to the engine oil passage 13 via a first inflow passage 4a and a first outflow passage 4b.

In the vehicular drive system 40 of this embodiment, the heat exchanger 4 is connected with the return oil passage 63k. Therefore, the second oil 6 that has been subjected to heat exchange by the heat exchanger 4 is supplied to the intake side of the second oil pump 62. With this arrangement, warm-up of the second oil pump 62 is promoted. During warm-up of the transmission 3, the temperature of the second oil 6 that has been subjected to heat exchange by the heat exchanger 4 becomes higher than the temperature of the second oil 6 in the oil pan 61. Accordingly, the second oil 6 subjected to heat exchange is supplied to the intake oil passage 63a of the second oil 6, so that the temperature of the second oil 6 in the intake oil passage 63a can be raised. Thus, even when the temperature Dt of the second oil 6 in the oil pan 61 is not sufficiently elevated, the intake resistance, internal loss, etc. of the second oil pump 62 can be reduced. In other words, according to the vehicular drive system 40 of this embodiment, the second oil pump 62 can be warmed up, with an amount of heat exchange which is smaller than a total amount of heat exchange required to raise the oil temperature of the oil pan 61 as a whole, and loss torque of the transmission 3 can be promptly reduced.

Referring next to FIG. 22, flow of the second oil 6 when the lock-up clutch 7a is in the released state will be described. To release the lock-up clutch 7a, the ECU 50 issues a lock-up release command to the lock-up relay valve 68. In response to the lock-up release command, the lock-up relay valve 68 communicates the fourth oil passage 63f with the release-side supply oil passage 63i, and communicates the engagement-side supply oil passage 63h with the lubricating-system oil passage 63j, as shown in FIG. 22. In this manner, the second oil 6 whose hydraulic pressure has been regulated by the lock-up control valve 67 flows into the torque converter 7 via the lock-up relay valve 68 and the release-side supply oil passage 63i, as shown in FIG. 22. As a result, the lock-up clutch 7a is released. The second oil 6 in the torque converter 7 is discharged from the engagement-side supply oil passage 63h into the lubricating-system oil passage 63j via the lock-up relay valve 68.

When the temperature Dt of the second oil 6 is lower than a lock-up permission temperature, the ECU 50 inhibits engagement of the lock-up clutch 7a, and places the lock-up clutch 7a in the released state. Accordingly, while the temperature Dt of the second oil 6 is lower than the lock-up permission temperature, the second oil 6 delivered from the second oil pump 62 flows into the torque converter 7, and raises the oil temperature in the torque converter 7, as shown in FIG. 22. Since the second oil 6 delivered from the second oil pump 62 is a high-temperature oil that has been subjected to heat exchange in the heat exchanger 4, warm-up of the torque converter 7 is promoted. The second oil 6 warmed by the heat exchanger 4 can be fed directly to the second oil pump 62, without being returned to the oil pan 61; therefore, the second oil 6 does not suffer from wasteful heat dissipation, and the second oil pump 62 can be efficiently warmed.

The temperature Dt of the second oil 6 based on which it is determined whether the lock-up clutch 7a can be engaged or not is the oil temperature in the torque converted 7, and may be the temperature detected by the oil temperature sensor 51, for example. In this case, it is preferable that the oil temperature sensor 51 detects the oil temperature of the release-side supply oil passage 63i, or the oil temperature in the torque converter 7. However, the invention is not limited to this arrangement, but the oil temperature in the torque converter 7 may be estimated, based on the temperature Dt of the second oil 6 detected at any location in the transmission oil passage 63.

When the temperature Dt of the second oil 6 is low, the amount of oil leakage in each part of the transmission oil passage 63 is small, as compared with the case where the temperature Dt is high. Thus, while the temperature Dt of the second oil 6 is low, the flow rate of the second oil 6 that flows through the return oil passage 63k is larger than that obtained after the temperature Dt is raised. As a result, when the temperature Dt of the second oil 6 is low, the amount of the second oil 6 that circulates in the transmission oil passage 63 via the return oil passage 63k without returning to the oil pan 61 is increased, as compared with the case where the temperature Dt is high. Accordingly, increase of the temperature of the second oil 6 in the transmission oil passage 63 is advantageously promoted.

Referring to FIG. 23, flow of the second oil 6 when the lock-up clutch 7a is in the engaged state will be described. When the temperature Dt of the second oil 6 is equal to or higher than the lock-up permission temperature, the ECU 50 permits engagement of the lock-up clutch 7a. To engage the lock-up clutch 7a, the ECU 50 issues a lock-up engagement command to the lock-up relay valve 68. In response to the lock-up engagement command, the lock-up relay valve 68 communicates the fourth oil passage 63f with the engagement-side supply oil passage 63h, and communicates the fifth oil passage 63g with the lubricating-system oil passage 63j. Thus, the second oil 6 whose hydraulic pressure that has been regulated by the lock-up control valve 67 flows into the torque converter 7, via the lock-up relay valve 68 and the engagement-side supply oil passage 63h, as shown in FIG. 23.

Also, the ECU 50 outputs a command value of a lock-up hydraulic pressure to the lock-up control valve 67. The lock-up control valve 67 regulates or adjusts the hydraulic pressure of the fourth oil passage 63f to the command value of the lock-up hydraulic pressure. When the lock-up clutch 7a is engaged, the second oil 6 is not discharged from the torque converter 7. Accordingly, when the lock-up clutch 7a is engaged, the flow rate of the second oil 6 discharged from the secondary regulator valve 66 into the fifth oil passage 63g is increased, as compared with the case where the lock-up clutch 7a is released. As a result, the flow rate of the second oil 6 that passes through the return oil passage 63k is increased. Consequently, increase of the temperature of the second oil 6 is promoted, and the effective stroke of the second oil pump 62 is reduced, so that the efficiency of the second oil pump 62 is improved. The improved efficiency of the second oil pump 62 is advantageous in reduction of the loss torque of the transmission 3.

The manner of connecting the heat exchanger 4 to the transmission oil passage 63 is not limited to the one illustrated above by way of example. For example, the heat exchange part 4e may be connected directly to the engine oil passage 13, and may be connected to the return oil passage 63k via a second inflow passage 4c and a second outflow passage 4d.

Figure 24:
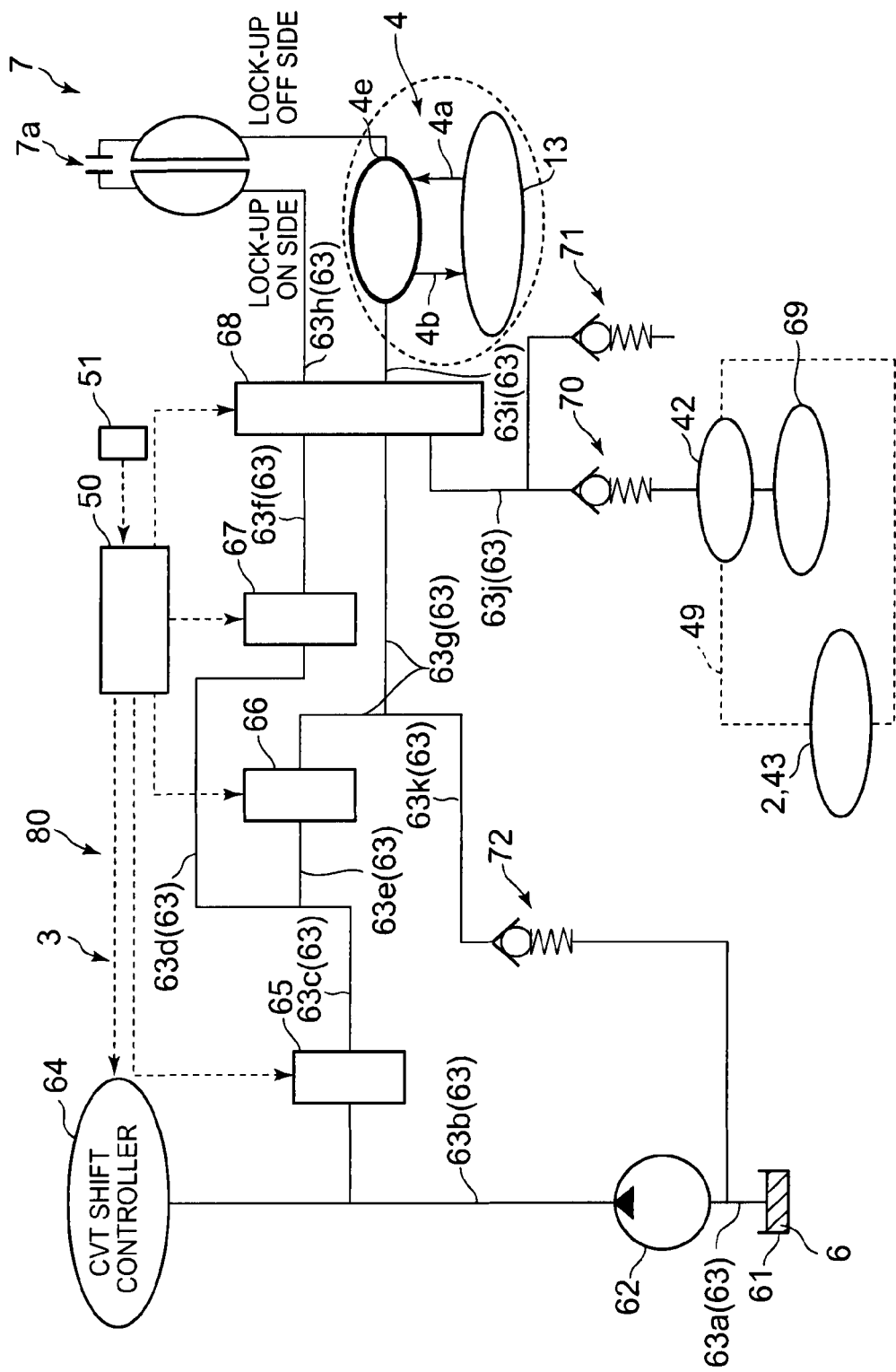
FIG. 24 is a view showing the arrangement of transmission oil passage according to a third embodiment of the invention.
Figure 25:
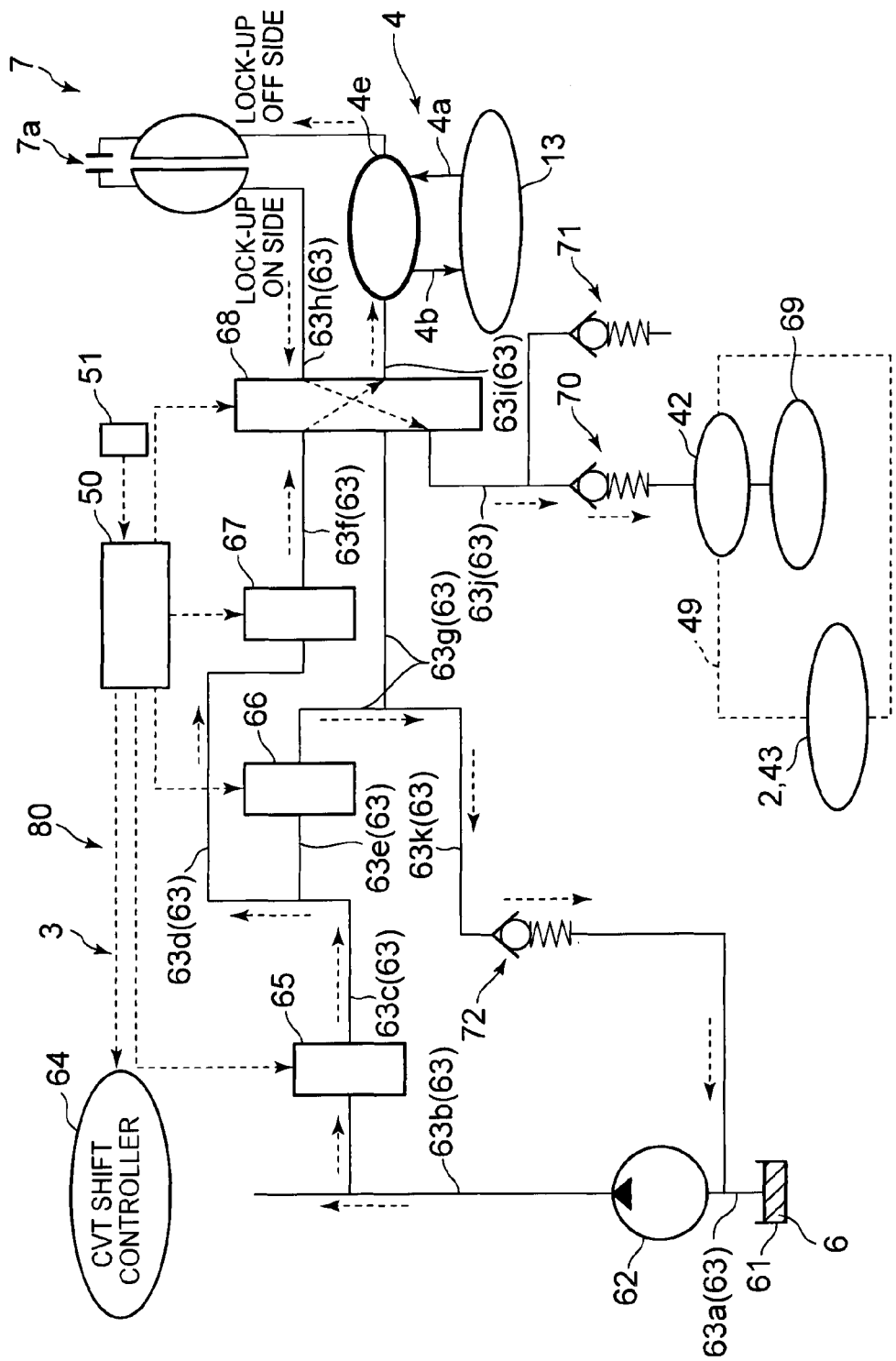
FIG. 25 is a view showing flow of oil when a lock-up clutch is released in the third embodiment.
Figure 26:
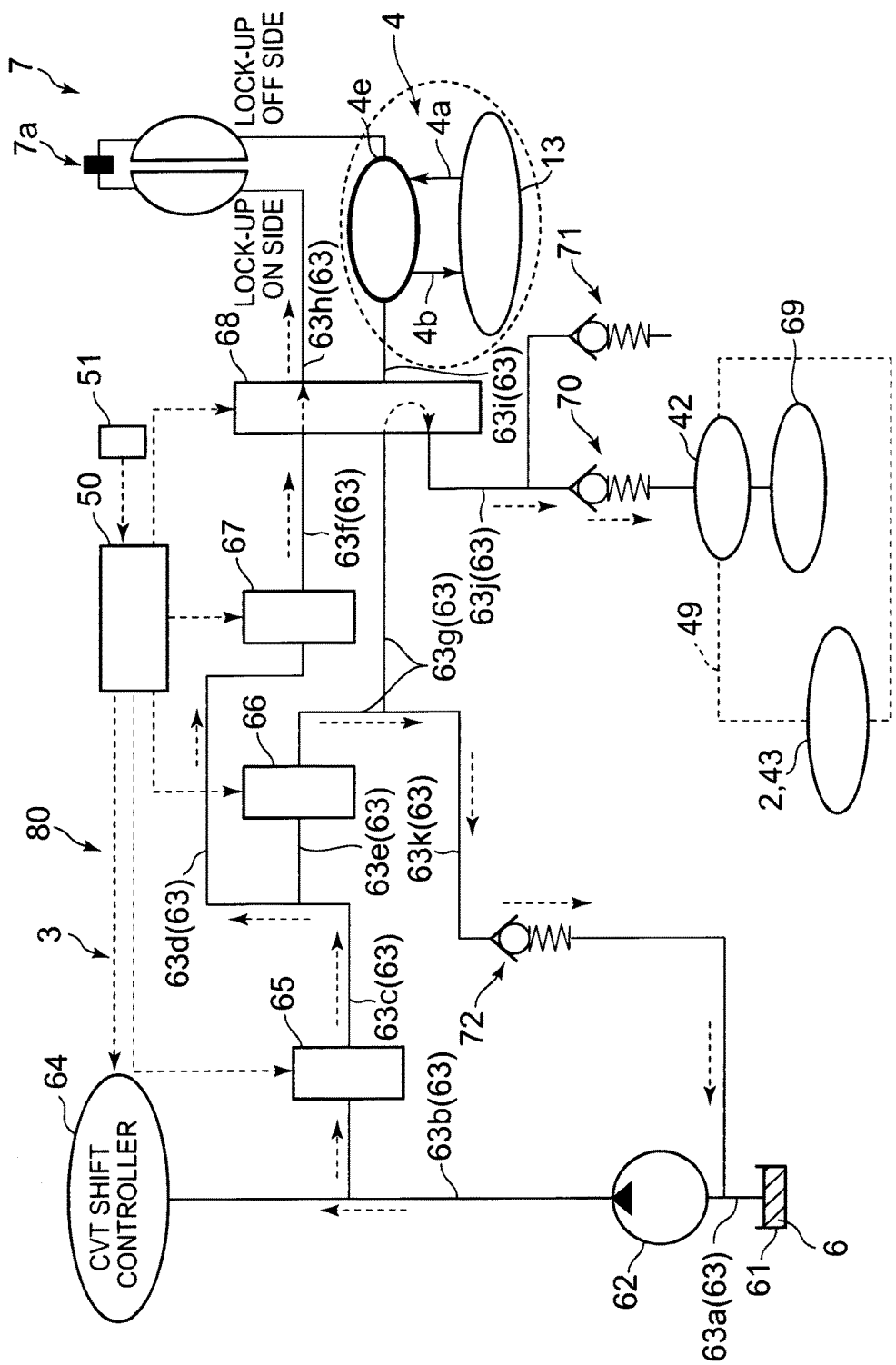
FIG. 26 is a view showing flow of oil when the lock-up clutch is engaged in the third embodiment.

Referring to FIG. 24 through FIG. 26, a third embodiment of the invention will be described. In the third embodiment, the same reference numerals are assigned to constituent elements having substantially the same functions as those as described above in the first embodiment and the second embodiment, and repeated explanation of these elements will be omitted. FIG. 24 is a view showing the arrangement of transmission oil passage according to the third embodiment. FIG. 25 is a view showing flow of oil when the lock-up clutch is released. FIG. 26 is a view showing flow of oil when the lock-up clutch is engaged.

In the transmission 3, control that depends on the oil temperature may be performed. For example, in the transmission 3 according to this embodiment, while the temperature Dt of the second oil 6 in the torque converter 7 is low, the lock-up clutch 7a is inhibited from being engaged. A vehicular drive system 80 of this embodiment preferentially supplies the second oil 6 warmed by the heat exchanger 4, to the torque converter 7. Thus, engagement of the lock-up clutch 7a can be promptly permitted.

The vehicular drive system 80 of the third embodiment is different from the vehicular drive system 40 of the second embodiment in that the heat exchanger 4 is connected to the release-side supply oil passage 63i, instead of the return oil passage 63k. As shown in FIG. 24, the heat exchange part 4e of the heat exchanger 4 is connected to the release-side supply oil passage 63i. The heat exchange part 4e is connected to the engine oil passage 13 via the first inflow passage 4a and the first outflow passage 4b. With the heat exchanger 4 thus connected to the release-side supply oil passage 63i, warm-up of the torque converter 7 can be promoted.

As shown in FIG. 25, when the lock-up clutch 7a is released, the second oil 6 flows from the lock-up relay valve 68 into the release-side supply oil passage 63i, and flows into the torque converter 7 via the heat exchange part 4e. Namely, the second oil 6 that has been subjected to heat exchange in the heat exchanger 4 is supplied to the release-side supply oil passage 63i of the torque converter 7. Accordingly, the second oil 6 warmed in the heat exchanger 4 flows into the torque converter 7. Thus, the temperature Dt of the second oil 6 flowing into the torque converter 7 can be raised, and warm-up of the torque converter 7 can be promoted. According to the vehicular drive system 80 of this embodiment, increase of the oil temperature in the torque converter 7 is prioritized, and a temperature condition under which engagement of the lock-up clutch 7a is permitted can be promptly satisfied. If the lock-up clutch 7a is engaged, slipping (loss) of the torque converter 7 is eliminated, so that the efficiency of the transmission 3 is improved. Thus, according to the vehicular drive system 80 of this embodiment, the efficiency of the transmission 3 can be improved.

As shown in FIG. 26, when the lock-up clutch 7a is engaged, the second oil 6 is not discharged from the torque converter 7. Accordingly, when the lock-up clutch 7a is engaged, the flow rate of the second oil 6 discharged from the secondary regulator valve 66 into the fifth oil passage 63g is increased, as compared with the case where the lock-up clutch 7a is released. As a result, the flow rate of the second oil 6 that passes through the return oil passage 63k is increased. Consequently, increase of the temperature of the second oil 6 is promoted, and the effective stroke of the second oil pump 62 is reduced, advantageously resulting in reduction of the loss torque of the transmission 3.

The transmission oil passage 63 may be configured so that the second oil 6 that has been subjected to heat exchange by the heat exchanger 4 is supplied not only to the torque converter 7, but also to the second oil pump 62. For example, the outlet-side oil passage of the heat exchanger 4 may branch into two passages, and one of these passages may be connected to the release-side supply oil passage 63i, while the other passage may be connected to the return passage 63k.

Figure 27:
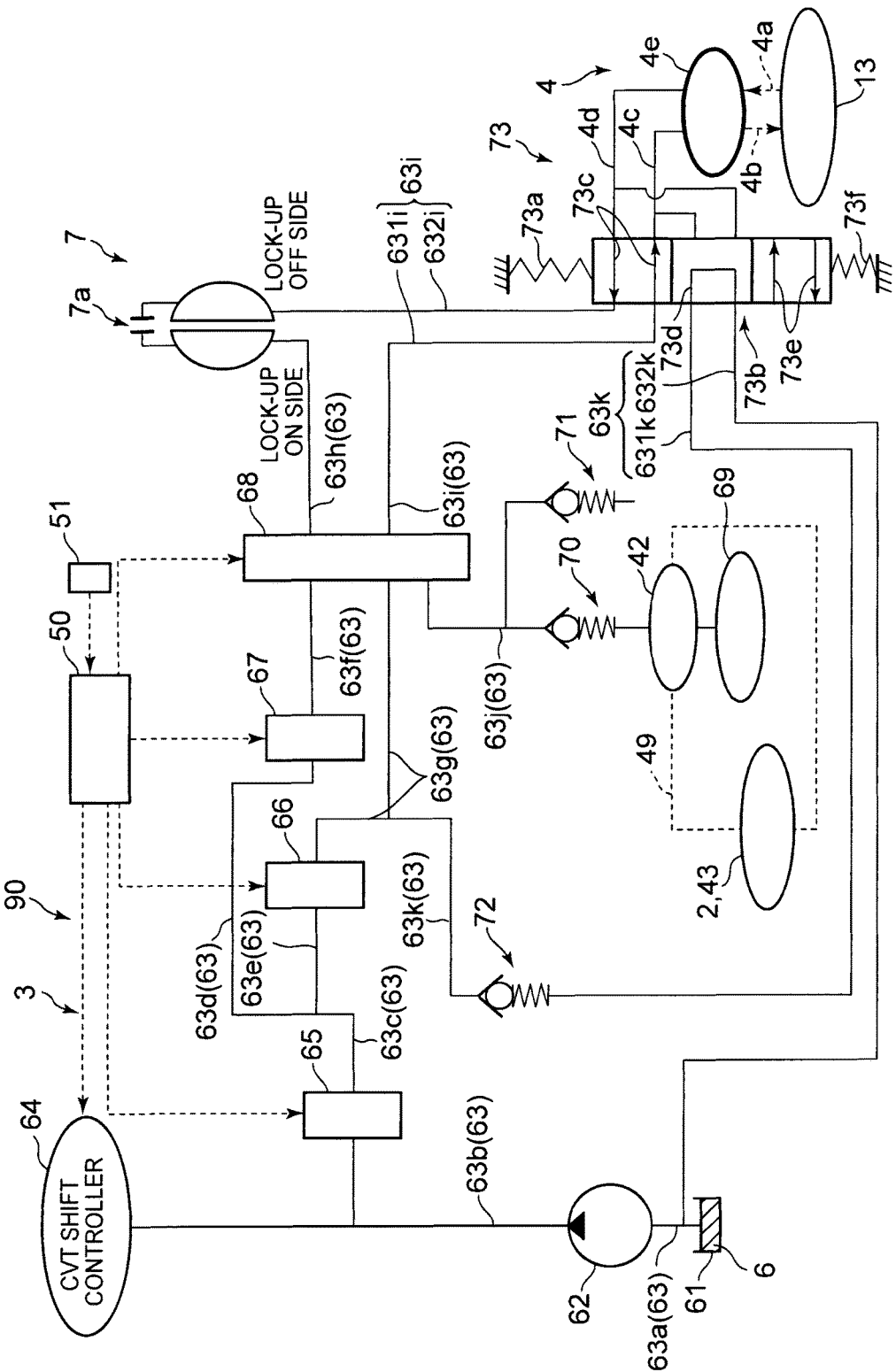
FIG. 27 is a view showing the arrangement of transmission oil passage according to a fourth embodiment of the invention.
Figure 28:
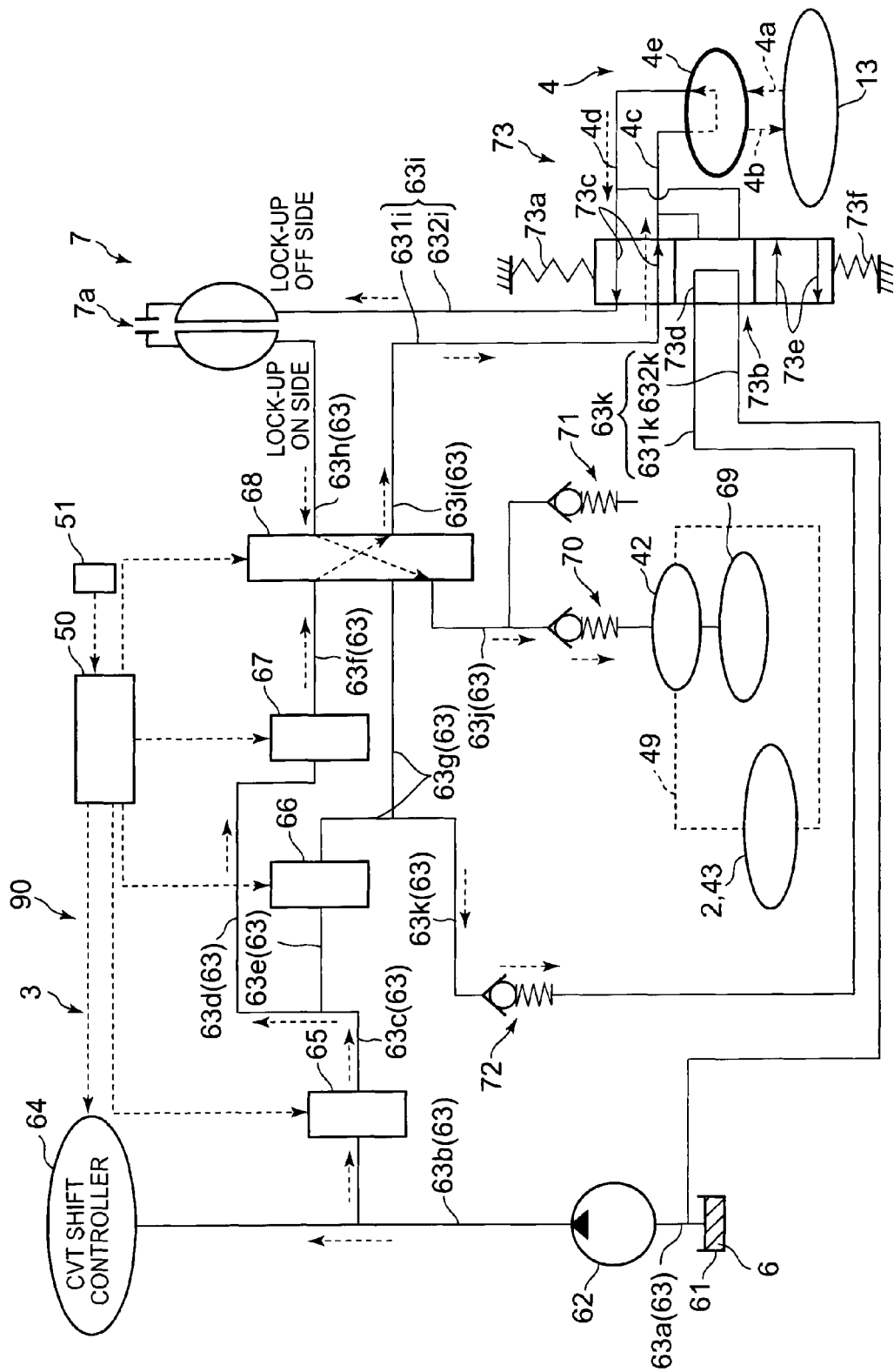
FIG. 28 is a view showing flow of oil when the temperature of the second oil is low in the fourth embodiment.
Figure 29:
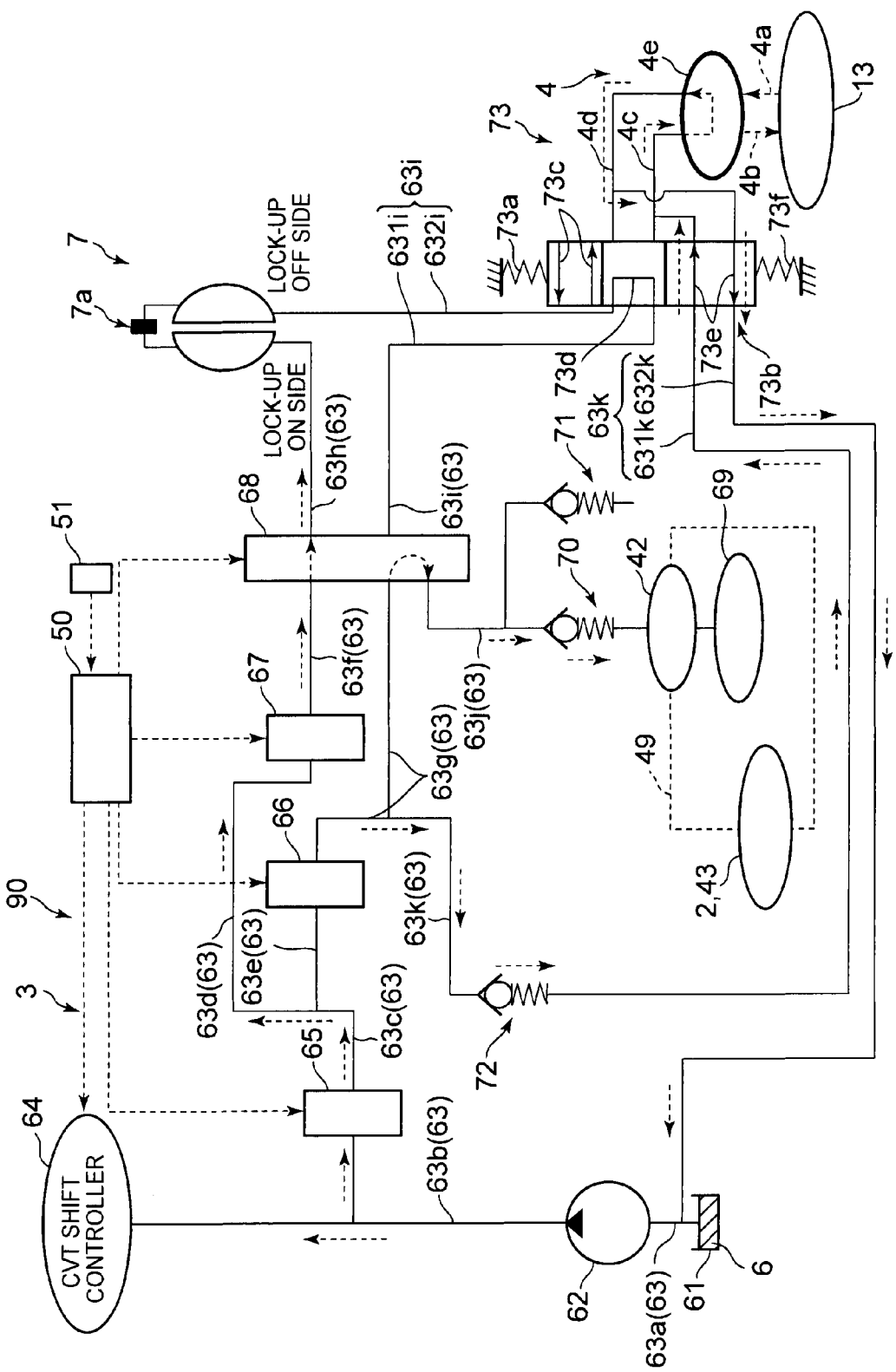
FIG. 29 is a view showing flow of oil when the temperature of the second oil is high in the fourth embodiment.

Referring to FIG. 27 through FIG. 29, a fourth embodiment of the invention will be described. In the fourth embodiment, the same reference numerals are assigned to constituent elements having substantially the same functions as those as described above in the first embodiment through the third embodiment, and repeated explanation of these elements will be omitted. FIG. 27 is a view showing the arrangement of transmission oil passage according to the fourth embodiment. FIG. 28 is a view showing flow of oil when the temperature of the second oil is low. FIG. 29 is a view showing flow of oil when the temperature of the second oil is high.

As shown in FIG. 27, a vehicular drive system 90 of the fourth embodiment includes a heat-sensitive switching valve 73. The switching valve 73 connects the heat exchanger 4 to a selected one of the release-side supply oil passage 63i and the return oil passage 63k. In other words, the switching valve 73 switches the system between a condition where the second oil 6 that has been subjected to heat exchange by the heat exchanger 4 is supplied to the intake side of the second oil pump 62 and a condition where the second oil 6 that has been subjected to heat exchange is supplied to the release-side supply oil passage 63i of the torque converter 7. The switching valve 73 includes a return spring 73a, main body 73b, first communication part 73c, second communication part 73d, third communication part 73e, and a drive mechanism 73f. The drive mechanism 73f of this embodiment is formed of a shape-memory alloy, and deforms according to temperature. The return spring 73a produces bias force to push the main body 73b toward one side of the switching valve 73. When the temperature is higher than a predetermined operating temperature (transformation temperature) that is determined in advance according to the lock-up permission temperature, the drive mechanism 73f operates to restore a predetermined shape. The restoring force of the drive mechanism 73f is generated in a direction opposite to the bias force of the return spring 73a. The shape of the drive mechanism 73f is, for example, the shape of a coil spring, but is not limited to this shape. For example, the drive mechanism 73f may be in the shape of a plate spring, or the like.

The drive mechanism 73f deforms according to the temperature of the drive mechanism 73f itself. The drive mechanism 73f transmits and receives heat to and from the second oil 6 via the main body 73b, etc. Accordingly, the temperature of the drive mechanism 73f changes according to the temperature Dt of the second oil 6, and becomes close to the temperature Dt of the second oil 6. In this embodiment, when the temperature Dt of the second oil 6 that flows through the switching valve 73 is equal to or higher than the lock-up permission temperature, the drive mechanism 73f generates restoring force so as to restore the predetermined shape.

When the temperature of the drive mechanism 73f is lower than the above-mentioned operating temperature, the drive mechanism 73f is contracted under the bias force of the return spring 73a, as shown in FIG. 28. In this condition, the switching valve 73 selectively connects the heat exchanger 4 to the release-side supply oil passage 63i via the first communication part 73c. More specifically, an inlet side 631i of the release-side supply oil passage 63i is communicated with the second inflow passage 4c of the heat exchanger 4, and an outlet side 632i of the release-side supply oil passage 63i is communicated with the second outflow passage 4d of the heat exchanger 4, as shown in FIG. 28. Also, an inlet side 631k and an outlet side 632k of the return oil passage 63k are communicated with each other via the second communication part 73d of the switching valve 73.

If a lock-up release command is issued to the lock-up relay valve 68 in this condition, the second oil 6 that flows from the lock-up relay valve 68 into the inlet side 631i of the release-side supply oil passage 63i is fed to the second inflow passage 4c of the heat exchanger 4 via the first communication part 73c, and flows into the heat exchange part 4e. The second oil 6 that has been subjected to heat exchange in the heat exchange part 4e flows from the second outflow passage 4d into the torque converter 7, via the first communication part 73c and the outlet side 632i of the release-side supply oil passage 63i. Namely, the switching valve 73 operates to prioritize warm-up of the torque converter 7, over warm-up of the second oil pump 62. In other words, the switching valve 73 operates to prioritize increase of the temperature of oil fed to the torque converter 7, over increase of the oil temperature of the second oil 6 pumped up by the second oil pump 62.

When the temperature of the drive mechanism 73f is higher than the operating temperature, the restoring force of the drive mechanism 73f moves the main body 73b against the bias force of the return spring 73a, and contracts the return spring 73a, as shown in FIG. 29. As a result, the switching valve 73 selectively connects the heat exchanger 4 to the return oil passage 63k via the third communication part 73e. More specifically, an inlet side 631k of the return oil passage 63k is communicated with the second inflow passage 4c of the heat exchanger 4 via the third communication part 73e, and an outlet side 632k of the return oil passage 63k is communicated with the second outflow passage 4d of the heat exchanger 4, as shown in FIG. 29. Also, the inlet side 631i and outlet side 632i of the release-side supply oil passage 63i are communicated with each other via the second communication part 73d. In this condition, the second oil 6 that flows from the fifth oil passage 63g into the inlet side 631k of the return oil passage 63k is fed to the second inflow passage 4c of the heat exchanger 4 via the third communication part 73e, and flows into the heat exchange part 4e. The second oil 6 that has been subjected to heat exchange in the heat exchange part 4e flows from the second outflow passage 4d into the intake oil passage 63a, via the third communication part 73e and the outlet side 632k of the return oil passage 63k. Namely, if warm-up of the torque converter 7 is completed, and engagement of the lock-up clutch 7a is permitted, the switching valve 73 promotes warm-up of the second oil pump 62.

The switching valve 73 may include a heat-sensitive actuator formed of a material other than shape-memory alloys, as the drive mechanism 73f. Also, the switching valve 73 may be an electronic control valve as typified by a solenoid.

Figure 30:
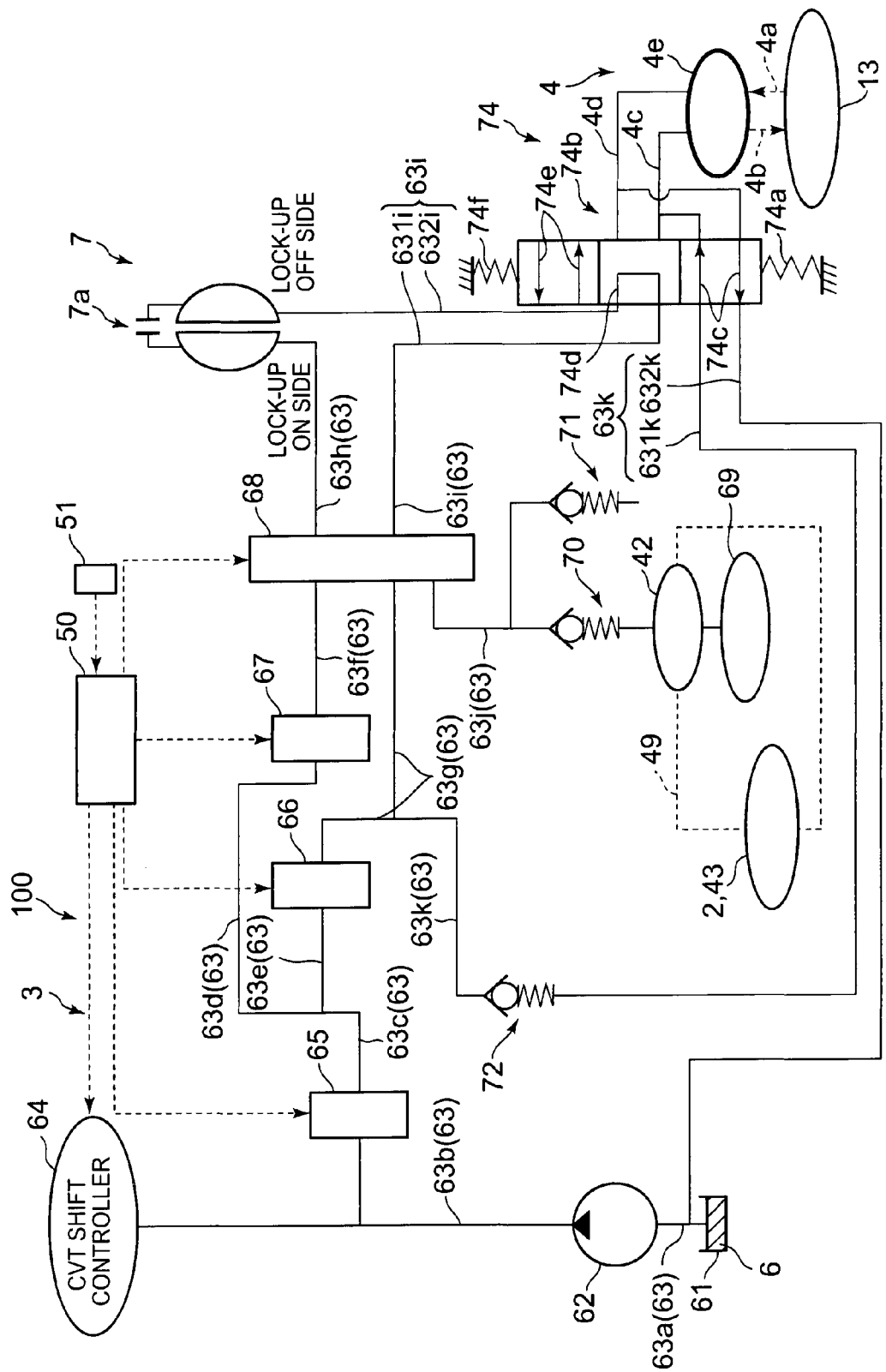
FIG. 30 is a view showing the arrangement of transmission oil passage according to a fifth embodiment of the invention.
Figure 31:
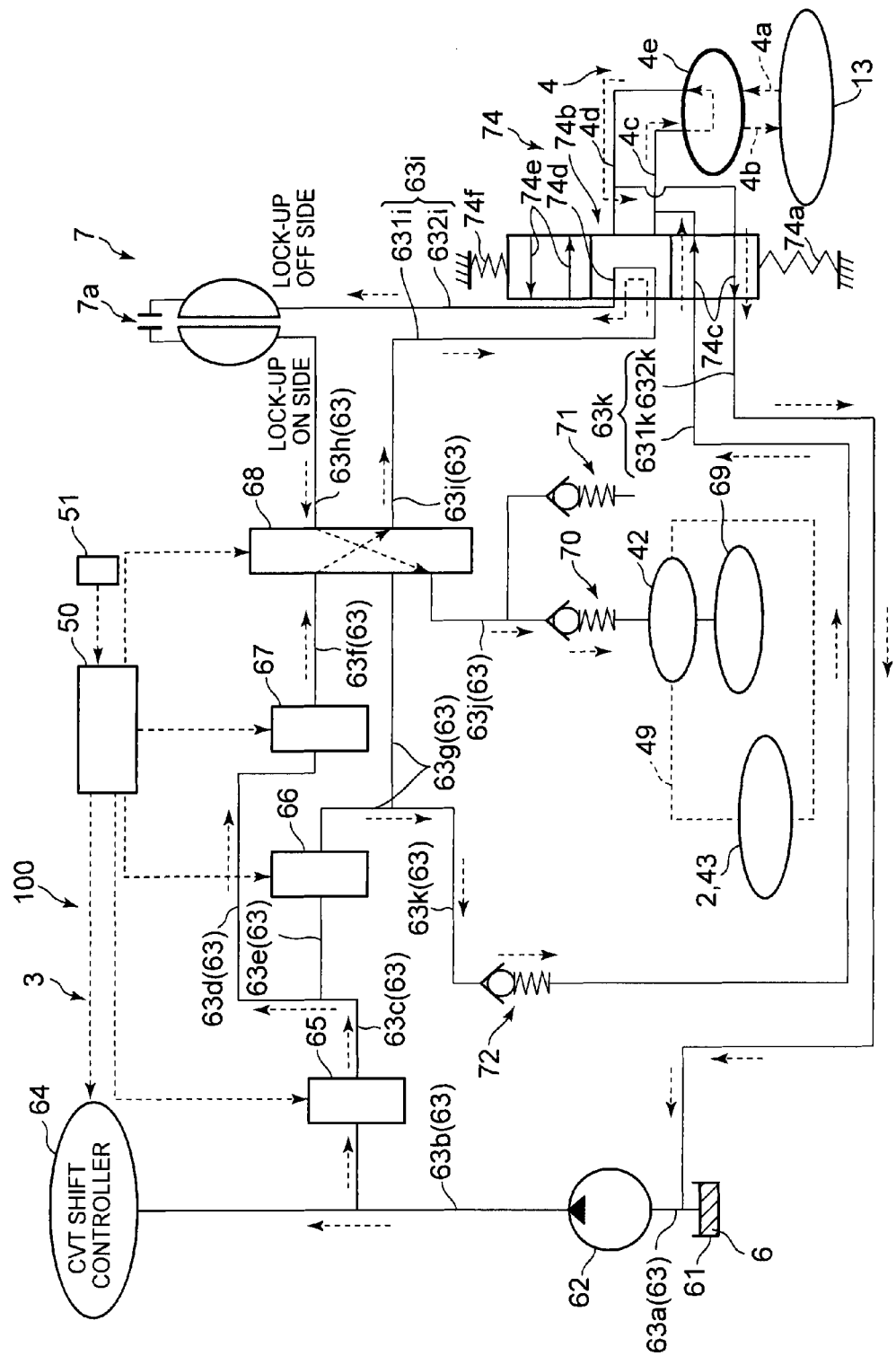
FIG. 31 is a view showing flow of oil when the temperature of the second oil is low in the fifth embodiment.
Figure 32:
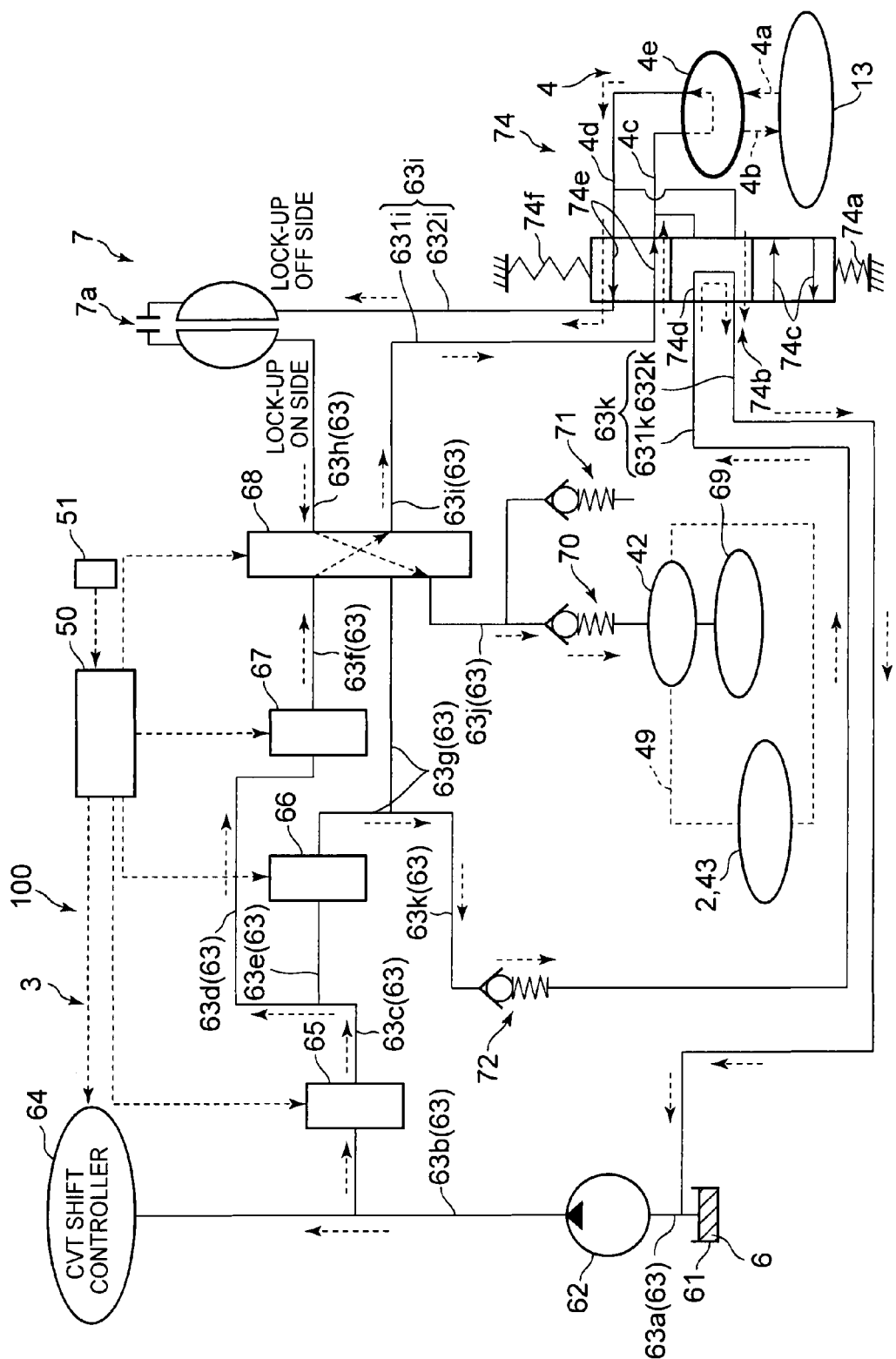
FIG. 32 is a view showing flow of oil when the temperature of the second oil is high in the fifth embodiment.

Referring to FIG. 30 through FIG. 32, a fifth embodiment of the invention will be described. In the fifth embodiment, the same reference numerals are assigned to constituent elements having substantially the same functions as those as described above in the first embodiment through the fourth embodiment, and repeated description of these elements will be omitted. FIG. 30 is a view showing the arrangement of transmission oil passage according to the fifth embodiment. FIG. 31 is a view showing flow of oil when the temperature of the second oil is low in the fifth embodiment. FIG. 32 is a view showing flow of oil when the temperature of the second oil is high in the fifth embodiment. A vehicular drive system 100 according to the fifth embodiment is different from the vehicular drive system 90 of the above-described fourth embodiment in that warm-up of the second oil pump 62 is prioritized over warm-up of the torque converter 7.

As shown in FIG. 30, the vehicular drive system 100 includes a heat-sensitive switching valve 74. The switching valve 74 connects the heat exchanger 4 with a selected one of the release-side supply oil passage 63i and the return oil passage 63k. The switching valve 74 includes a return spring 74a, main body 74b, first communication part 74c, second communication part 74d, third communication part 74e, and a drive mechanism 74f. The drive mechanism 74f has substantially the same function as the drive mechanism 73f of the fourth embodiment, and is formed of, for example, a shape-memory alloy.

When the temperature of the drive mechanism 74f is lower than the operating temperature, the drive mechanism 74f is contracted, under the bias force of the return spring 74a, as shown in FIG. 31. In this condition, the switching valve 74 selectively connects the heat exchanger 4 to the return oil passage 63k via the first communication part 74c. More specifically, the inlet side 631k of the return oil passage 63k is communicated with the second inflow passage 4c of the heat exchanger 4, and the outlet side 632k of the return oil passage 63k is communicated with the second outflow passage 4d of the heat exchanger 4, as shown in FIG. 31. Also, the inlet side 631i and outlet side 632i of the release-side supply oil passage 63i are communicated with each other via the second communication part 74d of the switching valve 74.

In this condition, the second oil 6 that flows from the fifth oil passage 63g into the inlet side 631k of the return oil passage 63k is fed to the second inflow passage 4c of the heat exchanger 4 via the first communication part 74c, and flows into the heat exchange part 4e. The second oil 6 that has been subjected to heat exchange in the heat exchange part 4e flows from the second outflow passage 4d into the intake oil passage 63a via the first communication part 74c and the outlet side 632k of the return oil passage 63k. The second oil 6 flowing into the intake oil passage 63a is pumped up by the second oil pump 62 and warms the second oil pump 62. Namely, the switching valve 74 operates to prioritize warm-up of the second oil pump 62 over warm-up of the torque converter 7. The operating temperature of the drive mechanism 74f in the fifth embodiment is determined based on the magnitude of loss of the second oil pump 62, for example. For example, if the efficiency has been sufficiently increased due to the temperature rise of the second oil pump 62, and the lock-up clutch 7a has not been permitted to be engaged, it is deemed more advantageous to warm up the torque converter 7, rather than further continuing warm-up of the second oil pump 62.

When the temperature of the drive mechanism 74f is higher than the operating temperature, the restoring force of the drive mechanism 74f moves the main body 74b against the bias force of the return spring 74a, and contracts the return spring 74a, as shown in FIG. 32. As a result, the switching valve 74 selectively connects the heat exchanger 4 to the release-side supply oil passage 63i via the third communication part 74e. More specifically, as shown in FIG. 32, the inlet side 631i of the release-side supply oil passage 63i is communicated with the second inflow passage 4c of the heat exchanger 4 via the third communication part 74e, and the outlet side 632i of the release-side supply oil passage 63i is communicated with the second outflow passage 4d of the heat exchanger 4 via the third communication part 74e. Also, the inlet side 631k and outlet side 632k of the return oil passage 63k are communicated with each other via the second communication part 74d.

In this condition, if a lock-up release command is issued to the lock-up relay valve 68, the second oil 6 flowing from the lock-up relay valve 68 into the inlet side 631i of the release-side supply oil passage 63i is fed to the second inflow passage 4c of the heat exchanger 4 via the third communication part 74e, and flows into the heat exchange part 4e. The second oil 6 that has been subjected to heat exchange in the heat exchange part 4e flows from the second outflow passage 4d into the torque converter 7, via the third communication part 74e and the outlet side 632i of the release-side supply oil passage 63i. In other words, once warm-up of the second oil pump 62 is completed, the switching valve 74 promotes warm-up of the torque converter 7.

The switching valve 74 may include a heat-sensitive actuator formed of a material other than shape-memory alloys, as the drive mechanism 74f. Also, the switching valve 74 may be an electronic control valve as typified by a solenoid.

Figure 33:
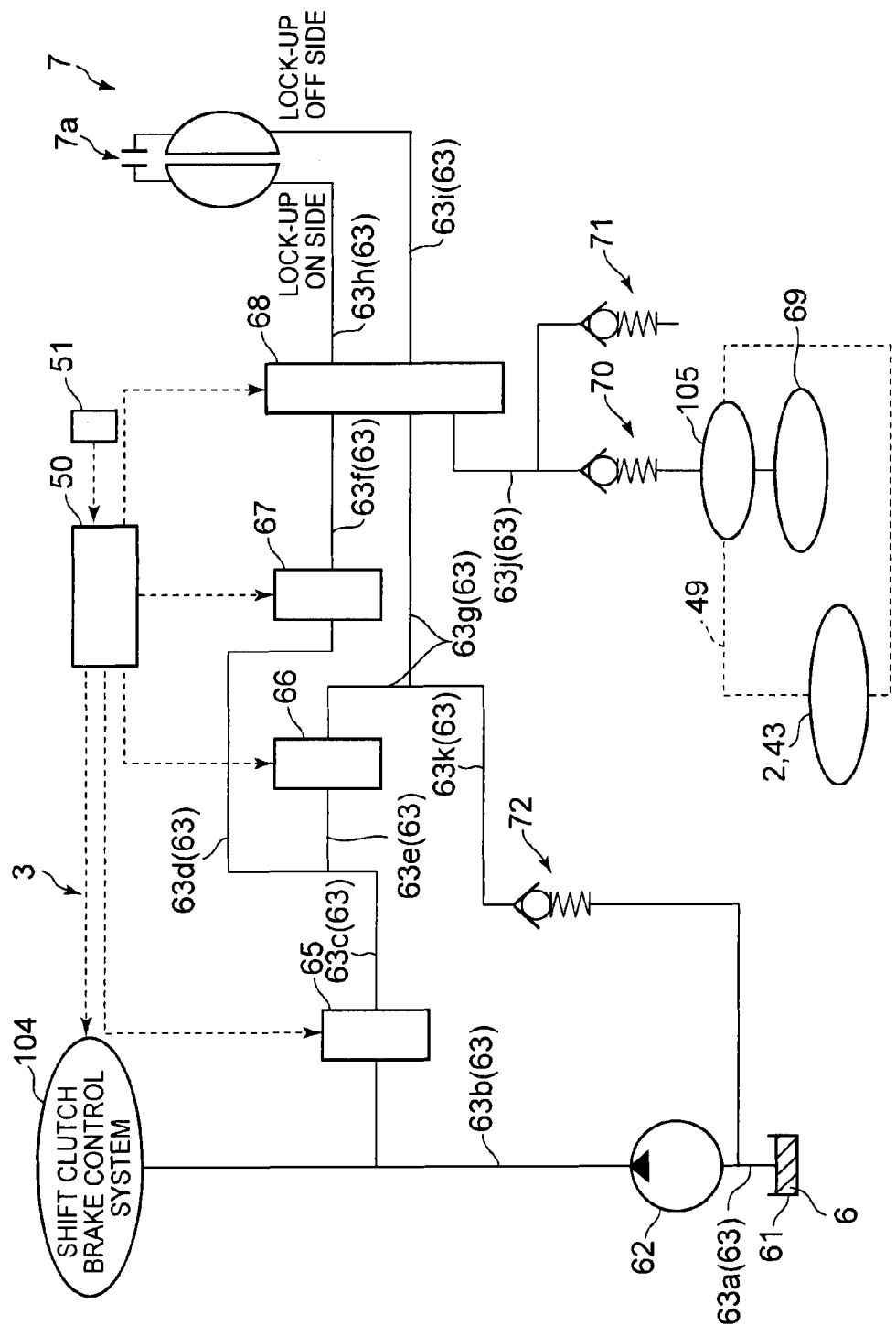
FIG. 33 is a view showing the arrangement of transmission oil passage according to a modified example of the embodiments of the invention.

Modified examples of the above-described embodiments will be described. In the second through fifth embodiments, the transmission 3 may be a multi-speed automatic transmission having two or more gear positions. In this case, the transmission 3 preferably has a shift controller 104, as shown in FIG. 33, in place of the CVT shift controller 64. FIG. 33 is a view showing the arrangement of transmission oil passage according to a modified example of each of the embodiments. The shift controller 104 controls clutch(es) and brake(s) associated with shifting of the transmission. Also, the transmission 3 preferably has an AT warmer 105, in place of the CVT warmer 42. The AT warmer 105 is operable to raise the temperature of the second oil 6, through heat exchange with the coolant 9.

In the above-described embodiments, the transmission 3 is not limited to the ones as illustrated above. Namely, each of the embodiments may be applied to a transmission other than the ones as illustrated above.

A part or parts to be warmed up by the second oil 6 warmed by the heat exchanger 4 is/are not limited to the ones as illustrated above. The part to be preferentially warmed up may be a friction material, control valve(s) of a hydraulic circuit, etc. in the multi-speed automatic transmission (such as AT), for example.

The contents disclosed in the above-described embodiments and modified examples may be combined as appropriate and implemented.

The invention claimed is:

1. A vehicular drive system, comprising:
an engine having first oil;
a transmission having second oil; and
a heat exchanger configured to exchange heat between the first oil and the second oil, a magnitude of an amount of reduction of loss torque in the transmission per unit amount of reduction of kinetic viscosity of the second oil being larger than a magnitude of an amount of increase of loss torque in the engine per unit amount of increase of the kinetic viscosity of the first oil.

2. The vehicular drive system according to claim 1, wherein
when compared in a same period during heat exchange, the magnitude of the amount of reduction of the loss torque in the transmission according to reduction of the kinetic viscosity due to a temperature rise of the second oil exceeds the magnitude of the amount of increase of the loss torque in the engine according to increase of the kinetic viscosity due to a temperature reduction of the first oil.

3. The vehicular drive system according to claim 1, wherein:
the transmission includes a transmission oil passage and a second oil pump;
the second oil pump is configured to feed the second oil under pressure via the transmission oil passage;
the heat exchanger is connected to the transmission oil passage; and
the heat exchanger is configured to exchange heat between the first oil and the second oil, the second oil flowing through the transmission oil passage.

4. The vehicular drive system according to claim 1, wherein:
the engine includes an engine oil passage, a first oil pump, and an oil filter;
the first oil pump is configured to feed the first oil under pressure via the engine oil passage;
the oil filter is disposed in the engine oil passage; and
the heat exchanger is connected to a downstream side of the oil filter in the engine oil passage, as viewed in a direction of flow of the first oil.

5. The vehicular drive system according to claim 1, further comprising an electronic control unit configured to supply the second oil to at least one of an intake side of a second oil pump or a supply oil passage of a torque converter, the second oil being an oil that has been subjected to heat exchange by the heat exchanger, the torque converter having a lock-up clutch.

6. The vehicular drive system according to claim 5, wherein:
the transmission includes a return oil passage through which the second oil is supplied to an intake oil passage of the second oil pump, the second oil being redundant oil as a part of the second oil delivered from the second oil pump under pressure; and
the heat exchanger is configured to exchange heat between the first oil and the second oil, the second oil flowing through the return oil passage.

7. The vehicular drive system according to claim 5, wherein:
the transmission includes a switching valve; and
the switching valve is configured to switch between a condition where the second oil that has been subjected to heat exchange is supplied to an intake side of the second oil pump, and a condition where the second oil that has been subjected to heat exchange is supplied to a supply oil passage of the torque converter.

8. The vehicular drive system according to claim 1, further comprising an electronic control unit configured to reduce a flow rate of the second oil after completion of warm-up of the transmission, such that the flow rate becomes smaller than that before completion of warm-up of the transmission, the second oil being an oil passing through the heat exchanger.

9. The vehicular drive system according to claim 1, further comprising:
an oil cooler configured to cool the second oil; and
a rotating electric machine located on a downstream side of the oil cooler in a flow passage of the second oil, wherein
the heat exchanger is connected to an upstream side of the oil cooler in the flow passage of the second oil.

10. The vehicular drive system according to claim 9, further comprising:
   an electric oil pump configured to cause the second oil to flow through the oil cooler; and
   an electronic control unit configured to: when a temperature of the second oil is equal to or higher than a specified temperature,
   (i) operate the electric oil pump, and
   (ii) supply the second oil cooled by the oil cooler to the rotating electric machine.

11. The vehicular drive system according to claim 1, further comprising:
   an oil cooler configured to cool the second oil;
   a rotating electric machine located on a downstream side of the oil cooler and the heat exchanger in a flow passage of the second oil;
   a flow control valve configured to control a flow rate of the second oil supplied to the heat exchanger and the flow rate of the second oil supplied to the oil cooler; and
   an electronic control unit configured to make the flow rate of the second oil supplied to the heat exchanger smaller than the flow rate of the second oil supplied to the oil cooler when a temperature of the second oil is equal to or higher than a specified temperature.

* * * * *

UNITED STATES PATENT AND TRADEMARK OFFICE
CERTIFICATE OF CORRECTION

PATENT NO. : 10,107,382 B2
APPLICATION NO. : 15/320586
DATED : October 23, 2018
INVENTOR(S) : Daisuke Tokozakura et al.

It is certified that error appears in the above-identified patent and that said Letters Patent is hereby corrected as shown below:

On the Title Page

Item (71), the Applicant's information is incorrect. Item (71) should read:
--(71) Applicant: TOYOTA JIDOSHA KABUSHIKI KAISHA, Toyota-shi (JP)--

Signed and Sealed this
Fourth Day of June, 2019

Andrei Iancu
*Director of the United States Patent and Trademark Office*